United States Patent [19]
Asanuma et al.

[11] Patent Number: 6,048,380
[45] Date of Patent: Apr. 11, 2000

[54] METHOD FOR DISPOSING SYNTHETIC RESINOUS MATERIAL

[75] Inventors: Minoru Asanuma, Fukuyama; Tatsuro Ariyama, Yokohama; Yukihiko Asakawa; Koichi Tomioka, both of Kawasaki; Mitsuhiro Fujii, Yokohama; Hiromi Nakamura; Tsutomu Shikada, both of Tokyo, all of Japan

[73] Assignee: NKK Corporation, Tokyo, Japan

[21] Appl. No.: 08/866,435

[22] Filed: May 30, 1997

[30] Foreign Application Priority Data

| Jun. 11, 1996 | [JP] | Japan | 8-170682 |
| Jul. 2, 1996 | [JP] | Japan | 8-191363 |
| Oct. 7, 1996 | [JP] | Japan | 8-284680 |
| Nov. 12, 1996 | [JP] | Japan | 8-314134 |

[51] Int. Cl.$^7$ ........................................ C21B 7/00
[52] U.S. Cl. ............................... 75/414; 585/241
[58] Field of Search ........................... 75/403, 414, 476; 585/241

[56] References Cited

U.S. PATENT DOCUMENTS

| 1,696,731 | 12/1928 | Reed et al. |
| 3,787,166 | 1/1974 | Schaub et al. |
| 3,933,989 | 1/1976 | Itoh et al. |
| 3,941,066 | 3/1976 | Itoh et al. |
| 4,317,800 | 3/1982 | Sloterdijk et al. ........................... 423/1 |
| 5,198,018 | 3/1993 | Agarwal ..................................... 75/403 |
| 5,244,490 | 9/1993 | Agarwal ..................................... 75/581 |
| 5,698,759 | 12/1997 | Fray ........................................ 75/353 |
| 5,772,727 | 6/1998 | De Haas et al. |

FOREIGN PATENT DOCUMENTS

| 0 622 465 A1 | 11/1994 | European Pat. Off. |
| 0 662 503 A1 | 7/1995 | European Pat. Off. |
| 2 127 988 | 10/1972 | France. |
| 2 169 965 | 9/1973 | France. |
| 42 38 935 A1 | 5/1994 | Germany. |
| 51-33493 | 9/1976 | Japan. |
| 8-507105 | 7/1996 | Japan. |
| 448574 | 6/1936 | United Kingdom. |

*Primary Examiner*—Melvyn Andrews
*Attorney, Agent, or Firm*—Frishauf, Holtz, Goodman, Langer & Chick, P.C.

[57] ABSTRACT

A method for disposing synthetic resinous material comprises: dechlorinating a synthetic resinous material by heating the synthetic resinous material and decomposing the same; and supplying the synthetic resinous material into the furnace as a fuel or a reducing agent. An apparatus comprises: a chlorine removing means for dechlorinating the synthetic resinous material by heating the synthetic resinous material; and a pulverizer for pulverizing the dechlorinated synthetic resinous material, a supply means for supplying the processed synthetic resinous material into a furnace.

20 Claims, 17 Drawing Sheets

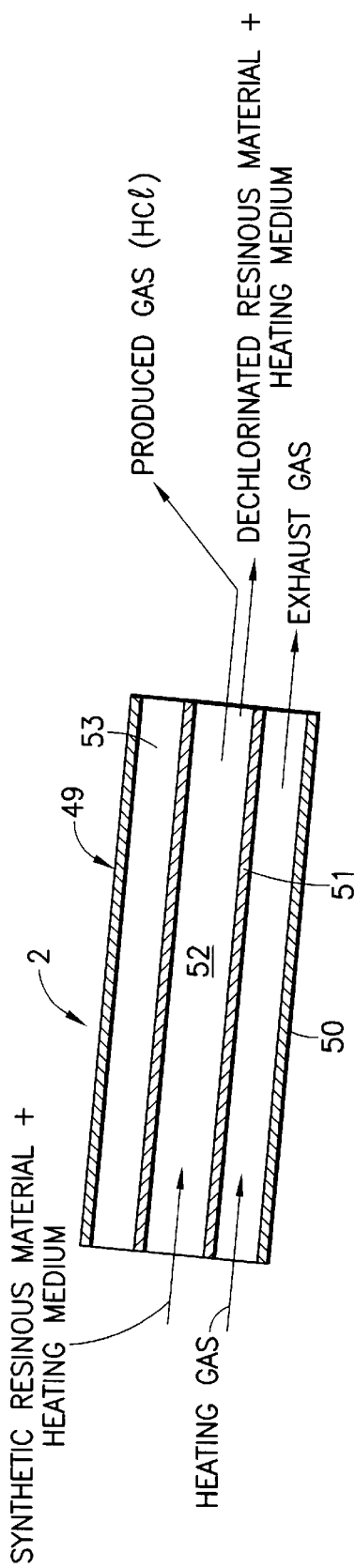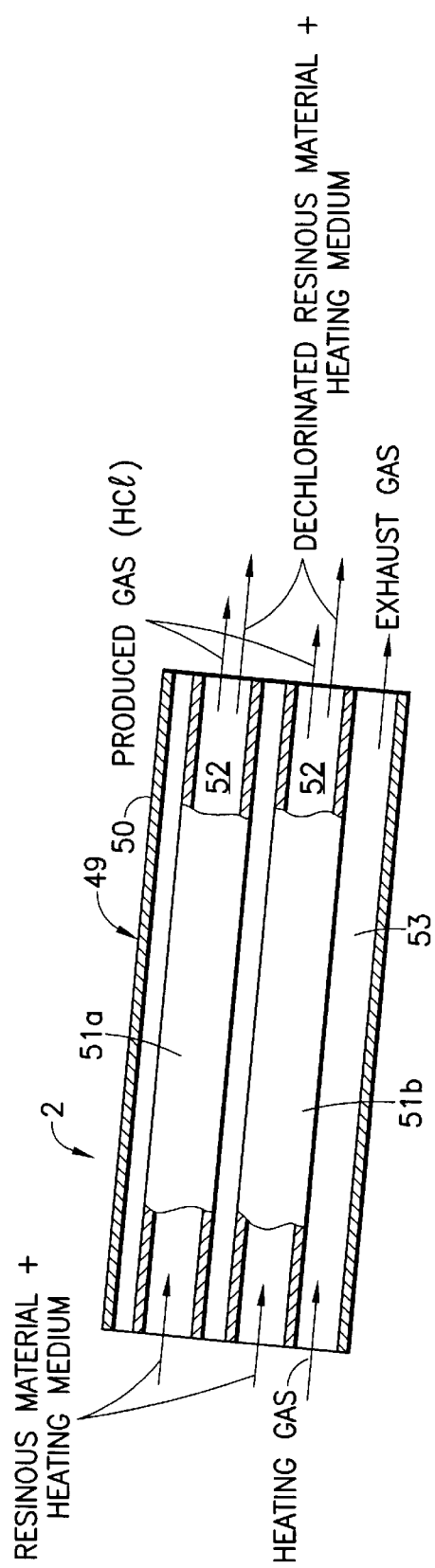

METHOD FOR DISPOSING SYNTHETIC RESINOUS MATERIAL

BACKGROUND OF THE INVENTION

1. Field of the Invention

The present invention relates to a method for disposing synthetic resinous material and an apparatus therefor, in the case of use of synthetic resinous material such as plastic as a fuel for a furnace and as a reducing agent for an iron source.

2. Description of the Related Arts

Recently, industrial waste and nonindustrial waste comprising synthetic resinous materials such as plastic are steeply increasing, and their disposal is a big social problem. In particular, since plastic, i.e., polymeric hydrocarbon compounds, have high combustion calorific power and damage furnace walls during disposal by combustion in general combustion furnaces, large amounts of plastic are dumped into landfills and the like without disposal by combustion. Dumping of plastic and the like is, however, undesirable in view of environmental disruption, and lack of landfill sites nowadays is a social problem. Therefore, methods of mass-disposal other than dumping are eagerly awaited for these synthetic resinous materials.

Under such circumstances, methods for using synthetic resinous materials such as plastic as an auxiliary fuel or a reducing agent for an iron source are disclosed in Japanese Patent Laid-Open No. 8-507105 and Japanese Patent Publication No. 51-33493. These methods include blowing of pulverized synthetic resins into a blast furnace thorough a tuyere. The former, for example, discloses a particle size of 1 to 10 mm and a bulk density of 0.35 or more as actual conditions.

It is, however, said that synthetic resinous wastes contain approximately 15% on average of chlorine containing polymeric resins such as vinyl chloride resins. When supplying such synthetic resins into a blast furnace and the like, a large amount of toxic gas, e.g. hydrogen chloride, forms due to thermal decomposition or combustion of the chlorine containing polymeric resins and causes severe environmental pollution. Since the toxic gas is also a highly corrosive gas, it causes corrosion in pipework. Thus, only chlorine containing polymeric resins must be selectively removed in advance from the synthetic resinous material with high efficiency in order to prevent occurrence of such harmful gas.

Synthetic resinous material contained in industrial waste and non-industrial waste consists of various types, forms and shapes. For example, there are several hundred types of synthetic resinous materials, e.g., thermoplastic resins such as polyethylene and polyvinyl chloride, thermosetting resins such as phenol resins, engineering plastic and the like. These are present in the form of blocks such as plates, film or composite materials. Further, the material is present in various shapes, such as particles, long-size products and large-size products.

For removing in advance only the chlorine containing polymeric resins from waste synthetic resinous material, a wet separating process and a centrifugal separating process using gravity differences have been proposed. However, these separating processes have the following problems because the waste synthetic resinous material consists of various types, forms and types as described above.

(1) The resinous material must be made a uniform size in order to prevent shelf hanging and the like in separating equipment. Therefore, prior crushing for making resinous materials having different forms and shapes a uniform size is required.

(2) Wet separation processes are not capable of separating chlorine containing polymeric resins from other resinous materials when both have similar specific gravities.

(3) Separation efficiency may be low in some types of waste synthetic resinous material, for example, glossary wrapping film.

(4) Chlorine containing polymeric resins cannot be separated from composite materials, such as laminated sheets, comprising the chlorine containing polymeric resins and other resin(s).

(5) Since a separation liquid is used in the wet separation system and the centrifugal separation system using specific gravity differences, the process cost increases for disposing of the used, contaminated separation liquid.

(6) The separated chlorine containing polymeric resins must be disposed by a different process.

As described above, previous removal of chlorine containing polymeric resins from waste synthetic resinous material using a wet separation process and a centrifugal separation process using specific gravity differences has various problems for practical use. Therefore, simplified and economical disposal of chlorine containing polymeric resins contained in the waste synthetic resinous material is an important factor which determines the success of mass-disposal of synthetic resinous material as a fuel and the like.

SUMMARY OF THE INVENTION

It is an object of the present invention to provide a method and an apparatus for disposing large amounts of waste synthetic resinous material, such as plastic, as a fuel in a furnace and a reducing agent for an iron source without problems due to chlorine containing polymeric resins.

To attain the object, the present invention provides a method for disposing synthetic resinous material which comprises: processing said synthetic resinous material into shapes suitable for supply into a furnace; and supplying said synthetic resinous material into the furnace as a fuel or a reducing agent. The step of processing said synthetic resinous material includes heating said synthetic resinous material for dechlorination. The dechlorinated synthetic resinous material may be pulverized.

The processing of the synthetic resinous material can comprise separating chlorine containing polymeric resins in the synthetic resinous material to obtain a first synthetic resinous material not substantially containing the chlorine containing polymeric resins; and dechlorinating the separated chlorine containing polymeric resins by heating the separated chlorine containing polymeric resins and decomposing the same to obtain a second synthetic resinous material not substantially containing chlorine. The first synthetic resinous material and the second synthetic resinous material are supplied to the furnace.

In the case that the synthetic resinous material is a synthetic resin film, the processing of the synthetic resinous material comprises the steps of: crushing the synthetic resin film; reducing a volume of the crushed synthetic resin film; and heating the volume reduced synthetic resin film to decompose the same.

The processing of synthetic resinous material is preferably performed by using a rotary kiln. The synthetic resinous material and a heating medium are supplied into a rotary kiln. The supplied synthetic resinous material and heating medium are heated. The synthetic resinous material is dechlorinated by thermal decomposition.

The heating of the synthetic resinous material and the heating medium is carried out by the following manner:
  (a) heating the synthetic resinous material by using a heating means arranged at the outside of the rotary kiln,
  (b) supplying a heating gas into the rotary kiln, and heating the synthetic resinous material and heating medium,
  (c) providing a rotary kiln having an outer tube and an inner tube which is arranged in the outer tube, supplying the synthetic resinous material and the heating medium into the inside of the inner tube, and supplying the a heating gas to the space between the inner tube and the outer tube.

The heating medium is a particulate material which is used as an iron source, a reducing agent, a fuel or an auxiliary material. It is preferable that the particulate material is at least one selected from the group consisting of a fine coke, a fine iron ore, a fine sintered ore, a fine thermosetting resin and fine iron scrap.

The supplying of the synthetic resinous material and the heating medium is carried out so that a supplying position of the synthetic resinous material is farther from an inlet of the rotary kiln than a supplying position of the heating medium. In the case of using a fine additive having a specific gravity more than those of the synthetic resinous material and the heating medium, the supplying of the synthetic resinous material is carried out so that a supplying position of the synthetic resinous material is farther from an inlet of the rotary kiln than supplying positions of the heating medium and the fine additive. The fine additive is at least one particulate material selected from the group consisting of iron ore, sintered ore and iron scrap.

A molten plastic can be used as the heating medium. In such a case, a plastic including a chlorine containing synthetic resinous material and a thermosetting resin is supplied into the rotary kiln and heated. The heating temperature is preferably 250 to 350° C. The thermosetting resin melts in the rotary kiln to form the molten plastic. The molten plastic works as the heating medium. The chlorine containing synthetic resinous material is thermally decomposed to produce a hydrogen chloride and a residue of the chlorine containing synthetic resinous material.

In processing the synthetic resinous material, the residue adheres to the inner wall of the rotary kiln. To prevent the residue from adhering to the inner wall, it is desirable to blow a hot air having a temperature higher than a melting temperature of the synthetic resinous material at an melting portion of the synthetic resinous material inside of the inner tube. The hot air can be blown to the inside wall of the inner tube through a pipe for blowing a hot air.

The synthetic resinous material may include a steel having a coating film comprising a chlorine containing resin. The synthetic resinous material may include a metal having a coating film comprising a chlorine containing resin.

Further, the present invention provide an apparatus for disposing synthetic resinous material. The apparatus comprises a processing means for processing a synthetic resinous material into shapes suitable for supply into a furnace; and a supply means for supplying the processed synthetic resinous material into a furnace. The processing means comprises: a chlorine removing means for dechlorinating the synthetic resinous material by heating the synthetic resinous material; and a pulverizer for pulverizing the dechlorinated synthetic resinous material.

The processing means comprises: a separating means for separating chlorine containing polymeric resins in the synthetic resinous material to obtain a first synthetic resinous material not substantially containing the chlorine containing polymeric resins; and a dechlorination means for dechlorinating the separated chlorine containing polymeric resins by heating the separated chlorine containing polymeric resins and decomposing the same to obtain a second synthetic resinous material not substantially containing chlorine. The first synthetic resinous material and the second synthetic resinous material are supplied to the furnace.

In the case that the synthetic resinous material is a synthetic resin film, the processing means comprises means for crushing the synthetic resin film; means for reducing a volume of the crushed synthetic resin film; and means for heating the volume reduced synthetic resin film to decompose the same.

A rotary kiln is preferably used as the dechlorination means. It is preferable that the rotary kiln comprises an outer tube and an inner tube which is arranged in the outer tube. An inside of the inner tube is a passage for the synthetic resinous material and a heating medium. A space between the between the inner tube and the outer tube is a passage for a heating gas.

The rotary kiln can comprise an outer tube and a singular inner tube. An inside of the inner tube is a passage for the synthetic resinous material and a heating medium. A space between the between the inner tube and the outer tube is a passage for a heating gas. The rotary kiln can comprise an outer tube and at least two inner tubes. Insides of the at least two inner tubes are passages for the synthetic resinous material and the heating medium. A space between the between the at least two inner tubes and the outer tube is a passage for the heating gas. The rotary kiln can comprise a rotatable outer tube and a rotatable inner tube, which rotate as one body. The rotary kiln can comprise a stationary outer tube and a rotatable inner tube.

The rotary kiln further comprises at least two supply pipes for supplying the synthetic resinous material and the heating medium; said at least two supply pipes have supply openings respectively; and said supply openings are arranged at different positions in a longitudinal direction of the rotary kiln. The supply pipes are arranged so that the farther the supply opening is from an inlet of the rotary kiln, the upper the supply pipe is arranged.

BRIEF DESCRIPTION OF THE DRAWINGS

FIG. 8 is a schematic diagram illustrating another embodiment of a rotary kiln type chlorine removal installation.

FIG. 10 is a schematic diagram illustrating another embodiment of a rotary kiln type chlorine removal installation.

DESCRIPTION OF THE EMBODIMENT

Embodiment 1

Figure 1:
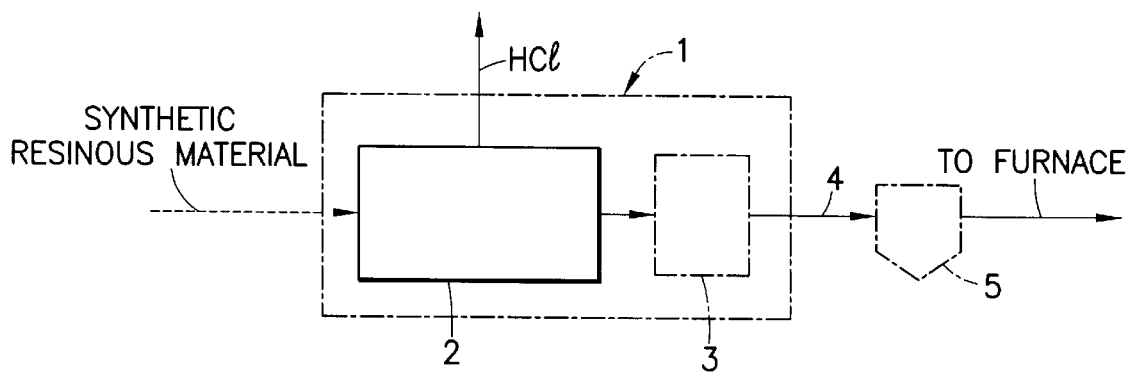
FIG. 1 is a schematic diagram illustrating an embodiment of a method and apparatus for processing in accordance with the present invention.

FIG. 1 is a schematic diagram of an embodiment of a method and apparatus for disposing of synthetic resinous material in accordance with the present invention, wherein numeral 1 represents a processing installation of the synthetic resinous material.

Synthetic resinous material to be fed to a furnace as a fuel or a reducing agent for an iron source is carried to the processing installation 1. In the present invention, dechlorination is performed to eliminate (gaseous) hydrogen chloride from chlorine containing polymeric resins by heating the synthetic resinous material in the disposal step. In FIG. 1, numeral 2 represents a chlorine removal installation for performing dechlorination.

When heating chlorine containing polymeric resins such as vinyl chloride, dechlorination (as hydrogen chloride) of the resinous material starts from near 250° C. and is completed at near 350° C. in general, and heating to a higher temperature starts thermal decomposition of hydrocarbons. Therefore, the above-mentioned dechlorination is preferably performed at a temperature of approximately 250 to 350° C., and more preferably approximately 300 to 350° C.

Types of chlorine removal installations 2 are not limited and include, for example, a screw extruding type with exterior heating, a pyrolysis furnace type, a fluid bed type and a rotary kiln type.

Figure 2:
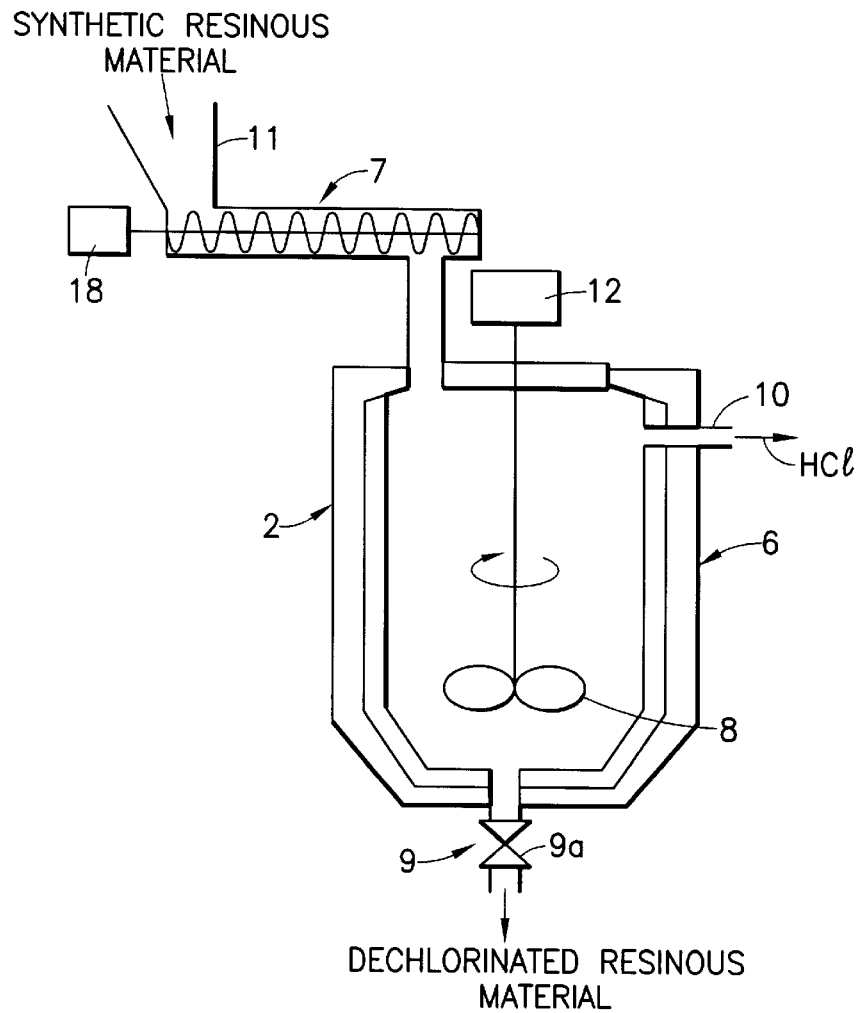
FIG. 2 is a schematic diagram illustrating an embodiment of a thermal decomposition type chlorine removal installation.

FIG. 2 shows an embodiment of a pyrolysis furnace type chlorine removal installation 2, wherein numeral 6 represents a pyrolysis furnace main body, numeral 7 represents a screw feeder for supplying chlorine containing polymeric resins into the pyrolysis furnace, numeral 8 represents an agitating blade for agitating the resinous material in the furnace, numeral 9 is a take-out outlet for removing the resinous material after dechlorination from the furnace, numeral 9a represents a cutoff valve and numeral 10 represents an outfall for exhausting the eliminated hydrogen chloride (HCl). The screw feeder 7 drives by means of a motor 18.

In the chlorine removal installation 2, synthetic resinous material is supplied into the furnace through a feeding port 11 and the screw feeder 7, and is heated to 250 to 350° C. while being agitated by the agitating blade 8 which rotates by means of a motor 12. Chlorine in the synthetic resins is eliminated as hydrogen chloride by thermal decomposition, and the hydrogen chloride is exhausted to the exterior of the furnace through the outfall 10. The resinous material after dechlorination (containing chlorine-free carbonaceous residue) is taken out of the furnace through the take-out outlet 9. Heating of the furnace may be performed by an external heating process such as gas heating or electrical heating, or a direct gas heating process for directly supplying gas into the furnace.

Figure 3:
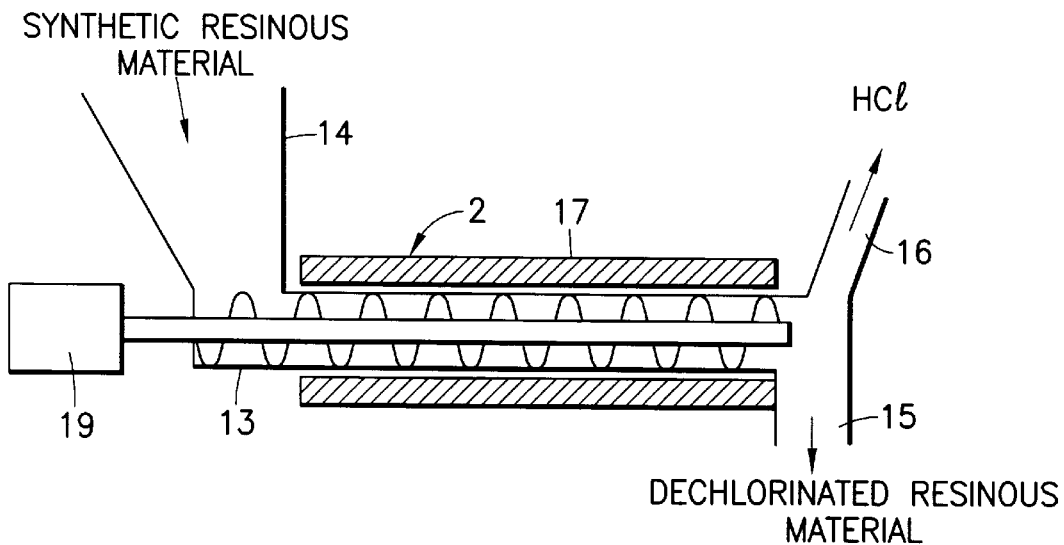
FIG. 3 is a schematic diagram illustrating an embodiment of a screw extruder type chlorine removal installation.

FIG. 3 shows an embodiment of a screw extruding type chlorine removal installation 2, in which numeral 13 represents a horizontal screw feeder, numeral 14 represents a feeding port for supplying resinous material to one end of the screw feeder, numeral 15 represents a take-out port for taking out the resinous material after treatment provided at the other end of the screw feeder, numeral 16 represents an outfall for gaseous hydrogen chloride, and numeral 17 represents a heater surrounding the screw feeder 13. The screw feeder 13 is driven by means of a motor 19.

In the chlorine removal installation 2 described in FIG. 3, synthetic resinous material fed from the feeding port 14 to the one end of the screw feeder 13 is moved by the screw feeder 13 while being heated to 250 to 350° C. by the heater 17, chlorine in the chlorine containing polymeric resins which is contained in the synthetic resinous material is eliminated by thermal decomposition due to heat and exhausted through the outfall 16. Dechlorination is completed by heating during the transfer, and the resinous material (containing carbonaceous residue after dechlorination) is taken out from the take-out port 15 through the other end of the screw feeder 13.

Figure 4:
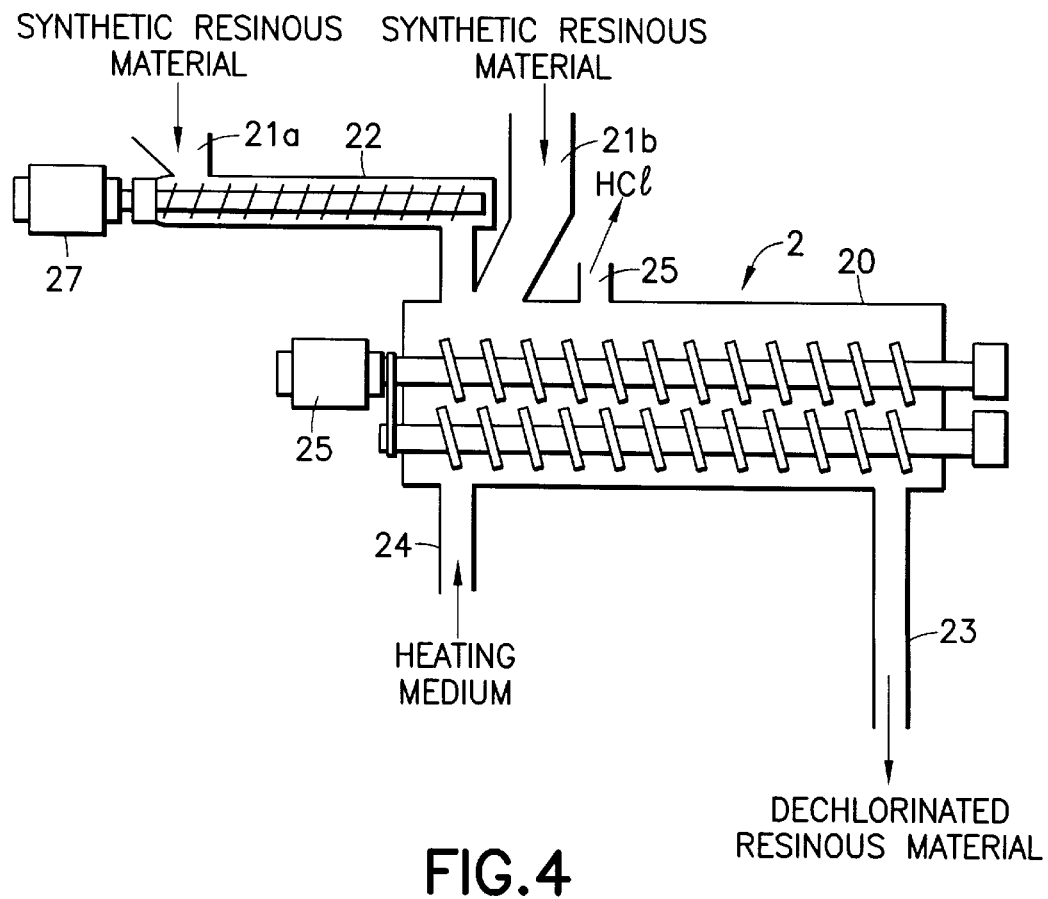
FIG. 4 is a schematic diagram illustrating an embodiment of a bi-axial screw extruder type chlorine removal installation.

FIG. 4 shows an embodiment of a biaxial screw extruder type chlorine removal installation 2, in which numeral 20 represents a horizontal biaxial screw feeder, numerals 21a and 21b represent feeding ports for supplying synthetic resinous material to one end of the screw feeder, and the feeding port 21a is provided with a supply screw feeder 22 for supplying the resins. Numeral 23 represents a take-out port for taking out the resinous material after treatment at the other end of the screw feeder 20, numeral 24 is a heating medium feeding port for feeding a heating medium to heat the resinous material (liquefied synthetic resins dechlorinated and liquefied in this installation are generally used as a heating medium), and numeral 25 represents an outfall for hydrogen chloride. The screw feeder 20 and the supply screw feeder 22 drive by means of motors 26 and 27, respectively.

In the chlorine removal installation 2, the synthetic resinous material fed to one end of the screw feeder 20 through either or both of the feeding port 21a (and the screw feeder 22) and the feeding port 21b are moved with the screw feeder 20 while being heated by a heating medium supplied into the screw feeder 20 through the heating medium feeding port 24 to approximately 250 to 350° C., chlorine in the chlorine containing polymeric resins which are contained in the synthetic resinous material is eliminated as hydrogen chloride due to thermal decomposition, and the hydrogen chloride is exhausted through the outfall 25. The resinous material after dechlorination (including carbonaceous residue after dechlorination) is taken out from the take-out port 23 through the other end of the screw feeder 20.

Figure 5:
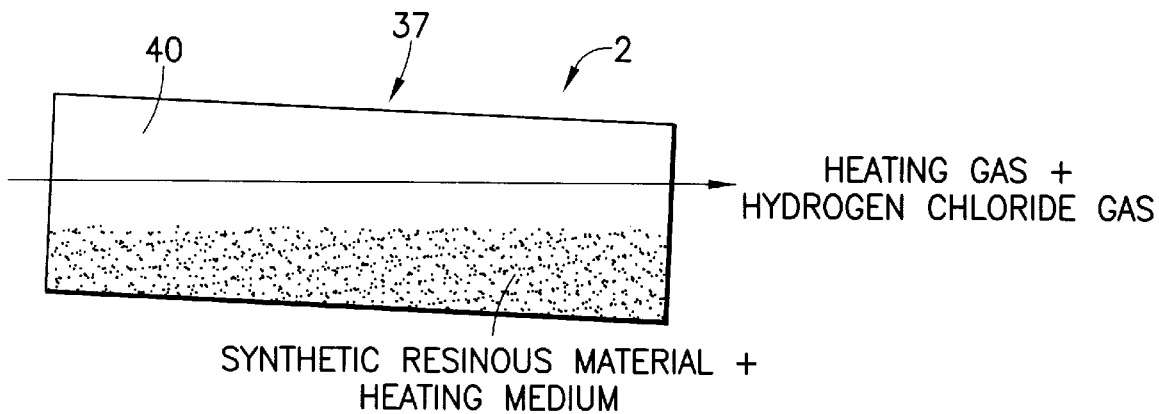
FIG. 5 is a schematic diagram illustrating an embodiment of a rotary kiln type chlorine removal installation.
Figure 6:
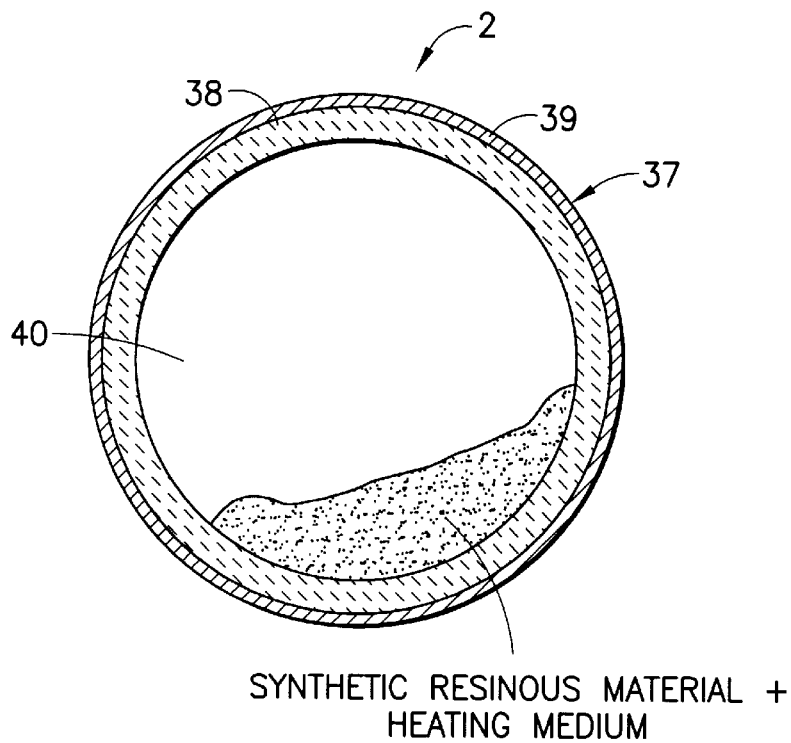
FIG. 6 is a transverse sectional view of the rotary kiln main body in FIG. 5.

FIG. 5 and FIG. 6 show an embodiment of a rotary kiln type chlorine removal installation 2, in which numeral 37 represents a main body of a rotary kiln, the main body 37 of the rotary kiln is composed of a refractory 38 and an iron sheath 39, and is provided with a passage 40 for dechlorination while carrying synthetic resinous material therein.

The synthetic resinous material and a heating medium, as well as a heating gas as a heating source, are supplied into the passage 40 through one end of the main body 37 of the rotary kiln. The heating gas heats the synthetic resinous material and the heating medium, as well as the entire kiln. The synthetic resinous material is heated and mixed with the heating medium by rotation of the kiln, and chlorine in the chlorine containing polymeric resins which are contained in the synthetic resinous material is evolved as hydrogen chloride.

The heating gas and hydrogen chloride evolved from the chlorine containing polymeric resins are exhausted through the other end of the passage 40, and hydrogen chloride in the exhausted gas is recovered with a hydrogen chloride absorption column or the like. The resinous material after dechlorination (including carbonaceous residue after dechlorination) is exhausted to the exterior of the kiln together with the heating medium.

In dechlorination using such a rotary kiln, it is preferable that at least one particulate material, which can be used as a reducing agent for an iron source, or as a fuel or as an auxiliary raw material for a furnace, be used as a heating medium fed into the passage 40 together with the synthetic resinous material. The resinous material after dechlorination can be used as a reducing agent for an iron source and as a fuel for the furnace without separating the heating medium. Examples of particulate materials suitable as the heating medium include powdered coke, powdered ore, and sintered powder. It is preferable that at least one material among them be used as a heating medium.

In order to prevent non-uniformity of the heating medium in the passage 40 and to improve heating efficiency, it is preferable that the particle size and specific gravity of the heating medium be as near as possible to that of the resinous material. In such a view, the use of powdered coke is most preferable.

Figure 7:
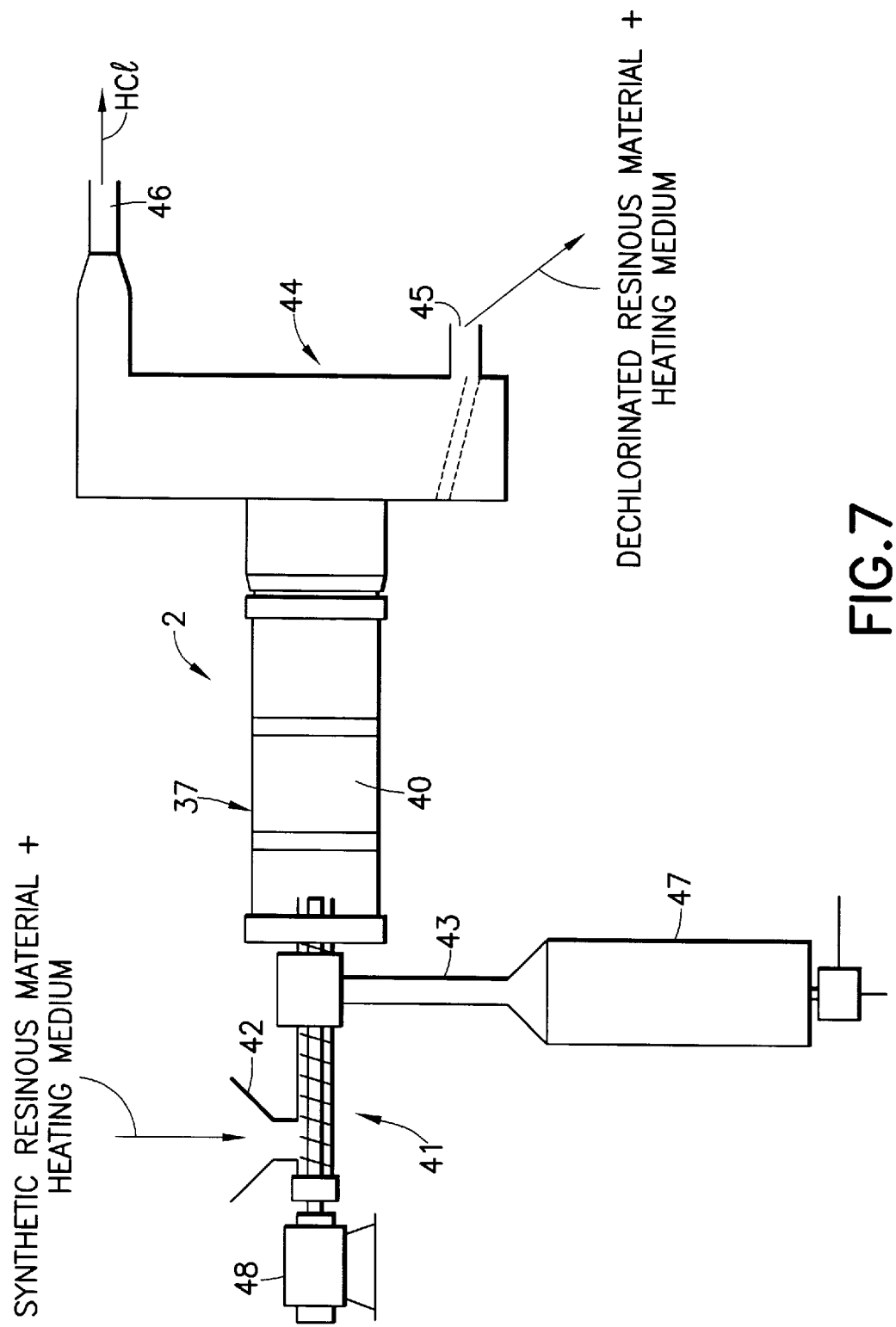
FIG. 7 is a schematic diagram illustrating another embodiment of a rotary kiln type chlorine removal installation.

FIG. 7 shows details of the rotary kiln type chlorine removal installations 2 in which one end of the main body 37 of the rotary kiln having the passage 40 is connected to a screw feeder 41 for supplying raw material having a feeding port 42 and a hot air conduit tube 43 for supplying a heating gas (hot air). The other end of the main body 37 of the rotary kiln is provided with a discharge installation 44 for the disposed resinous material and exhausted gas. The discharge installation 44 is provided with an outfall 45 for the resinous material at the bottom and an outfall 46 for the exhausted gas at the top. In the drawing, numeral 47 represents a hot air generator, and numeral 48 is a driving motor for the screw feeder 41.

In such a chlorine removal installation 2, synthetic resinous material and a heating medium are fed from one end of the main body 37 of the rotary kiln into the passage 40 through the screw feeder 41, and heating gas is fed from the hot air conduit tube 43.

Dechlorination of the synthetic resinous material is performed in the passage 40 as described above, a mixture of exhausted gas composed of heating gas and gaseous hydrogen chloride, dechlorinated synthetic resinous material (including chlorine-free carbonaceous residue) and the heating medium are transferred to the discharge installation, then the exhausted gas is discharged through the outfall 46 at the top and the mixture of the synthetic resinous material and the heating medium is discharged through the outlet 45 on the bottom.

The synthetic resinous material and the heating medium may be supplied to the main body 37 of the rotary kiln using different supply installations.

FIGS. 8, 9, 10, 11 and 12 show other embodiments of rotary kiln type chlorine removal installations 2 which have a common feature in that the main body of each rotary kiln comprises an outer tube and an inner tube provided therein, the interior of the inner tube is provided as a passage for resinous material to be disposed, and the space between the inner tube and the outer tube is provided as a passage for heating gas. Therefore, the formed hydrogen chloride gas can be exhausted without mixing with the heating gas, and facility and process costs for disposing of the exhaust gas can be drastically decreased compared to the installation shown in FIG. 5. Further, since the entire inner tube, in which hydrogen chloride gas forms, is heated by the heating gas, the entire inner tube can be held at a temperature range higher than 150° C., at which temperature or lower hydrogen chloride exhibits a strong corrosive property. Thus, the installation, and in particular the inner tube can be effectively prevented from corroding due to hydrogen chloride gas.

Figure 9:
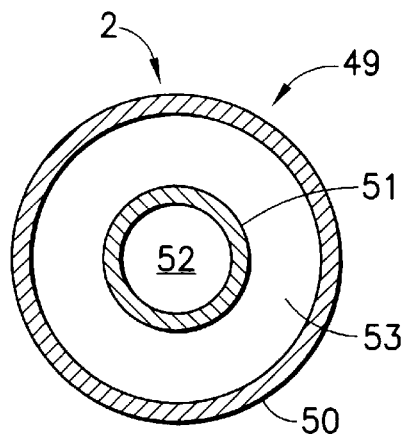
FIG. 9 is a transverse sectional view of the rotary kiln main body in FIG. 8.

In the chlorine removal installation 2 described in FIGS. 8 and 9, numeral 49 represents a rotary kiln main body, numeral 50 represents an outer tube and numeral 51 represents an inner tube, and the inner tube 51 is coaxially provided inside the outer tube 50 in the longitudinal direction. The interior of the inner tube 51 is provided as a passage 52 for resinous material to be disposed (a space for disposal), and the space between the outer tube 50 and the inner tube 51 is provided as a passage 53 for the heating gas.

Figure 11:
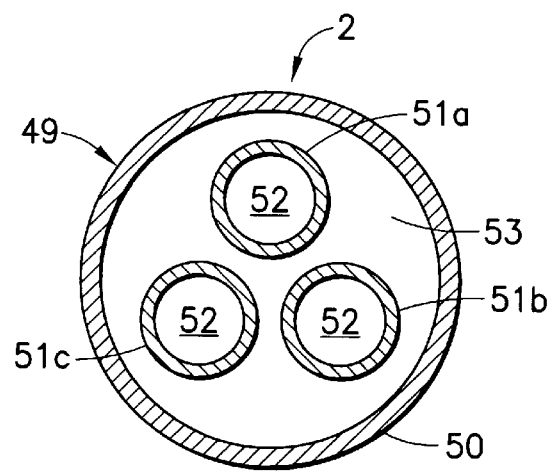
FIG. 11 is a transverse sectional view of the rotary kiln main body in FIG. 10.

FIGS. 10 and 11 show other embodiments having different inner tube configurations, that is, a plurality of inner tubes 51a through 51c are provided inside an outer tube 50 in contrast to the single inner tube configuration in the outer tube in FIGS. 8 and 9. The number of the inner tubes 51 provided inside the outer tube 50 may be appropriately determined.

In such configurations, the heat transfer area can be increased due to a plurality of inner tubes, and effective thermal conduction from the heating gas flowing through the passage 53 to the interior of the inner tube can occur. Further, the ratio of the resinous material to be disposed to the heating medium and the types of the resinous materials and heating medium can be changed for each inner tube, for example, a larger amount of the heating medium is added to a resinous material having a larger diameter and low disposal efficiency, whereas a smaller amount of the heating medium is added to a resinous material having a smaller diameter and high disposal efficiency, and these can be fed to different inner tubes during operation.

Figure 12:
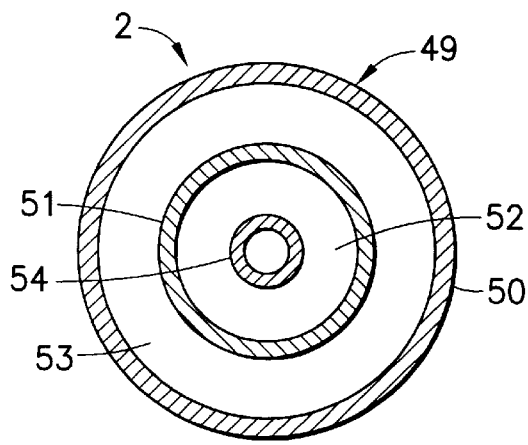
FIG. 12 is a schematic diagram illustrating another embodiment of a rotary kiln type chlorine removal installation.

FIG. 12 shows another embodiment, in which a gas conduit tube 54 is provided inside an inner tube 51 to further enhance the heating efficiency of the resinous material to be disposed. Such a gas conduit can be provided inside the inner tubes 51a through 51c in the installations shown in FIGS. 10 and 11.

In each chlorine removal installation 2 described in FIGS. 8 through 12, dechlorination of the synthetic resinous material can be achieved without trouble as long as the inner tubes 51 and 51a thorough 51c rotate along their circumferential direction. Thus, the entire rotary kiln main body 49 including the outer tube 50 may be rotatably provided in each installation, or alternatively, only the inner tubes 51 and 51a thorough 51c may be rotatably provided along their circumferential direction. In the installations described in FIGS. 10 and 11, the inner tubes 51a through 51c can integrally rotate (in this case, individual inner tubes eccentrically rotate as in the rotation of the rotary kiln main body 49), or independently rotate.

In each chlorine removal installation 2 described in FIGS. 8 through 12, synthetic resinous material, a heating medium (particulate material) and heating gas are supplied to the passages 52 and 53 from one end of the rotary kiln main body 49 through a supply mechanism not shown in the drawings.

The heating gas supplied to the passage 53 heats the entirety of all the inner tubes 51 and 51a thorough 51c, and the synthetic resinous material and the heating medium are heated through the tube walls. The heating gas passing through the passage 53 is exhausted from the other end of the rotary kiln main body 49.

On the other hand, the synthetic resinous material fed to the passages 52 inside the inner tubes 51 and 51a thorough 51c are mixed with the heating medium by rotation of the inner tubes 51 and 51a thorough 51c, and heated while travelling through the passage 52. Chlorine in the chlorine containing polymeric resins which are contained in the synthetic resinous material is eliminated as hydrogen chloride due to the heat, resulting in hydrogen chloride gas evolution. The synthetic resinous material after dechlorination (including carbonaceous residue after dechlorination) is taken out with the heating medium from the other end of the rotary kiln main body 49, and the hydrogen chloride gas is exhausted at the same time. Therefore, the hydrogen chloride gas formed by heating of the chlorine containing polymeric resins can be recovered without mixing with the heating gas.

A small amount of carrier gas (such as air) may be fed into the passages 52 in order to smoothly move the resinous material and the heating medium in the passages 52.

Since the heating gas flows through the exterior of the inner tubes 51 and 51a through 51c involving hydrogen chloride formation and the entirety of all the inner tubes are heated to a temperature of approximately 250 to 350° C. in the installations described above, a temperature region of 150° C. or less causing severe corrosive effects due to hydrogen chloride does not occur in the sections in contact with hydrogen chloride gas. Thus, the installations, and more particularly, the inner tubes, can be effectively prevented from corroding due to hydrogen chloride gas.

As the heating medium supplied to the passages 52 together with resinous material, it is preferable to use at least one powder, e.g. powdered coke, powdered ore and sintered powder, usable as a reducing agent for an iron source, a fuel and an auxiliary raw material for the furnace for the above-mentioned reason. Among these, it is most preferable to use powdered coke.

The chlorine removal installation 2 used in the present invention is not limited to those in FIG. 2 thorough 12, and that of an appropriate type and structure may be applied.

Since a major fraction of the resinous material other than chlorine containing resinous material is partially melted or completely melted after such dechlorination with heat, the resinous material is cooled with water or the like in the chlorine removal installation 2 or after discharge from the installation.

The synthetic resinous material which was dechlorinated in the chlorine removal installation 2 has already been sufficiently pulverized at the same time in some dechlorination methods. When synthetic resinous material is not sufficiently pulverized, it is pulverized with a pulverizer 4 to a particulate material, if necessary. Such pulverizing treatment may be performed during or after the above-mentioned cooling process. Thus, the pulverizer 4 may be integrated with the chlorine removal installation 2, so that the synthetic resinous material immediately after dechlorination is pulverized while cooling with water.

The synthetic resinous material disposed in the processing installation 1 as described above is fed to a blast furnace or the like by a supply means 4 as a fuel or a reducing agent for an iron source. The supply means 4 may be of a continuous type (for example, a transfer conveyor or a pneumatic tube) or a batch type, the batch type being preferable in view of being capable of continuous feeding into the furnace.

The synthetic resinous material may be temporarily reserved in a storage hopper 5 provided midway along the supply means 4 as described in the drawing before supplying to the furnace.

On the other hand, hydrogen chloride exhausted from the chlorine removal installation 2 may be fed to neutralization equipment to react with alkaline or alkaline earth materials, or may be fed to, for example, equipment for recovering hydrochloric acid (hydrochloric acid recovery equipment) from the hydrogen chloride gas.

Figure 13:
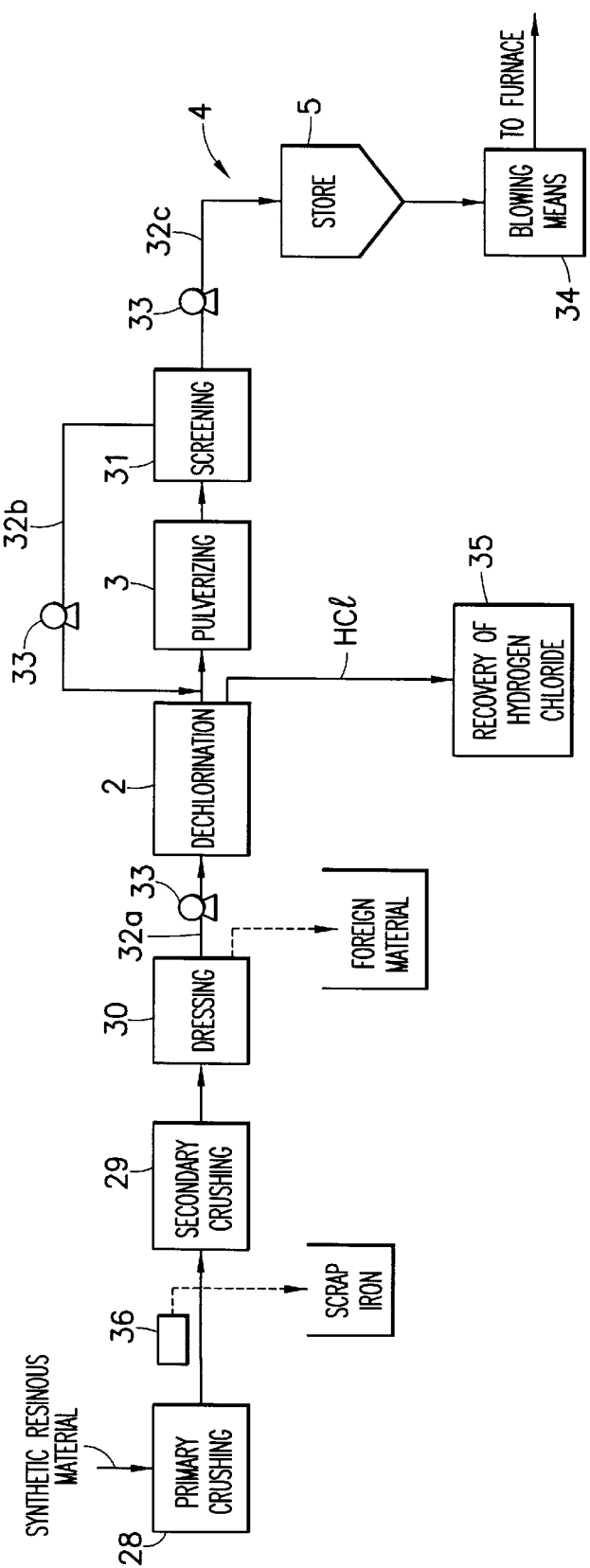
FIG. 13 is a schematic diagram illustrating another embodiment of a method and apparatus for processing in accordance with the present invention.

FIG. 13 shows another embodiment of the method and apparatus in accordance with the present invention, in which the processing steps comprise a primary crushing step, a secondary crushing step, a dressing step (removal of foreign material), a dechlorination step, a pulverizing step, and a screening step. For performing these steps, the processing installation is provided with a primary crusher 28, a secondary crusher 29, a selector 30, a chlorine removal installation 2, a pulverizer 3 and a screen 31, in this order from the inlet side of the processing line.

The synthetic resinous material fed to this processing line is rough crushed (for example, to a particle size of approximately 50 mm in the case of a block synthetic resinous material) in the primary crusher 28, fed to the secondary crusher 29 with a conveyor or the like, and crushed again (for example, to a particle size of approximately 20 mm in the case of a block synthetic resinous material). Scrap iron is removed from the synthetic resinous material after primary crushing by a magnetic separator 36 (an installation for magnetically attracting and removing scrap iron and the like) midway along the conveyor.

The synthetic resinous material after secondary crushing is fed into the selector 30 through a conveyor to remove foreign matter such as metal, sand and stone by air selection or the like. The materials are fed to the chlorine removal installation 2 to separate chlorine containing polymeric resins from the synthetic resinous material. The process and configuration of the chlorine removal installation 2 are substantially the same as above.

In the chlorine removal installation 2, the synthetic resinous material after removal of the chlorine containing polymeric resins is fed to the pulverizer 3 (a tertiary crusher) after cooling, and pulverized to a given particle size (for example, 6 mm or less) to obtain particulate synthetic resinous material. The pulverizer 4 and the chlorine removal installation 2 may be integrated as described above so that the synthetic resinous material immediately after dechlorination is pulverized while to be cooled with water and the like.

The resulting particulate synthetic resinous material is shifted with a screen classifier 31 to deliver only particles smaller than a given size (for example, 6 mm) to a storage silo 5 through a passage 4 as a feeding means. On the other hand, particulate synthetic resinous material larger than the given size is returned to the inlet side of the transfer line of the pulverizer 3 in order to be feed again into the pulverizer 3 together with other synthetic resinous materials. The rough particulate synthetic resinous material may be removed from the system to directly feed to other processes (for example, supply through the tops of blast furnaces and scrap melting furnaces, direct supply into coke furnaces and sintering furnaces).

In this embodiment, among transfer means (passages) for connecting individual installations, a transfer means 32*a* between the selector 30 and the chlorine removal installation 2, a transfer means 32*b* for returning the rough synthetic resinous material from the screen classifier 31 to the inlet side of the pulverizer 3, and a transfer means 32*c* (part of the supply means 4) between the screen classifier 31 and the storage silo 5 consist of pneumatic tubes (in the drawing, numeral 33 represents a fan), so that the particulate synthetic resinous material is pneumatically transferred through these pneumatic tubes.

The synthetic resinous material reserved in the storage silo 5 is transferred to a blowing means 34 which is a part of the supply means 4, and pneumatically transferred from the blowing means 34 to the tuyere of the blast furnace to be fed into the furnace.

The gaseous hydrogen chloride forming in the chlorine removal installation 2 is transferred to hydrochloric acid recovery equipment 35 to be recovered as hydrochloric acid. An embodiment of the hydrochloric acid recovery equipment 35 was described above.

As described above, the content of the chlorine containing polymeric resins in the synthetic resinous material fed to the processing installation changes with time to some extent depending on the waste, and it may occur for a relatively short time period (for example, several hours to several dozen hours) that synthetic resinous material not containing chlorine containing polymeric resins is supplied. In such a case, temporarily no chlorine containing polymeric resin will be supplied to the chlorine removal installation 2.

In the embodiment described in FIG. 13, a magnetic selector 36 is provided at only one point, but may be provided at a plurality of positions in the processing line.

The crushing method in each crusher (including the pulverizer 3) is appropriately determined, for example, cryogenic crushing of frozen synthetic resinous material is also applicable instead of usual mechanical crushing.

The inlet side of the processing installation described in FIG. 13 may be provided with other equipment such as a yard drier for the transferred synthetic resinous material.

Figure 14:
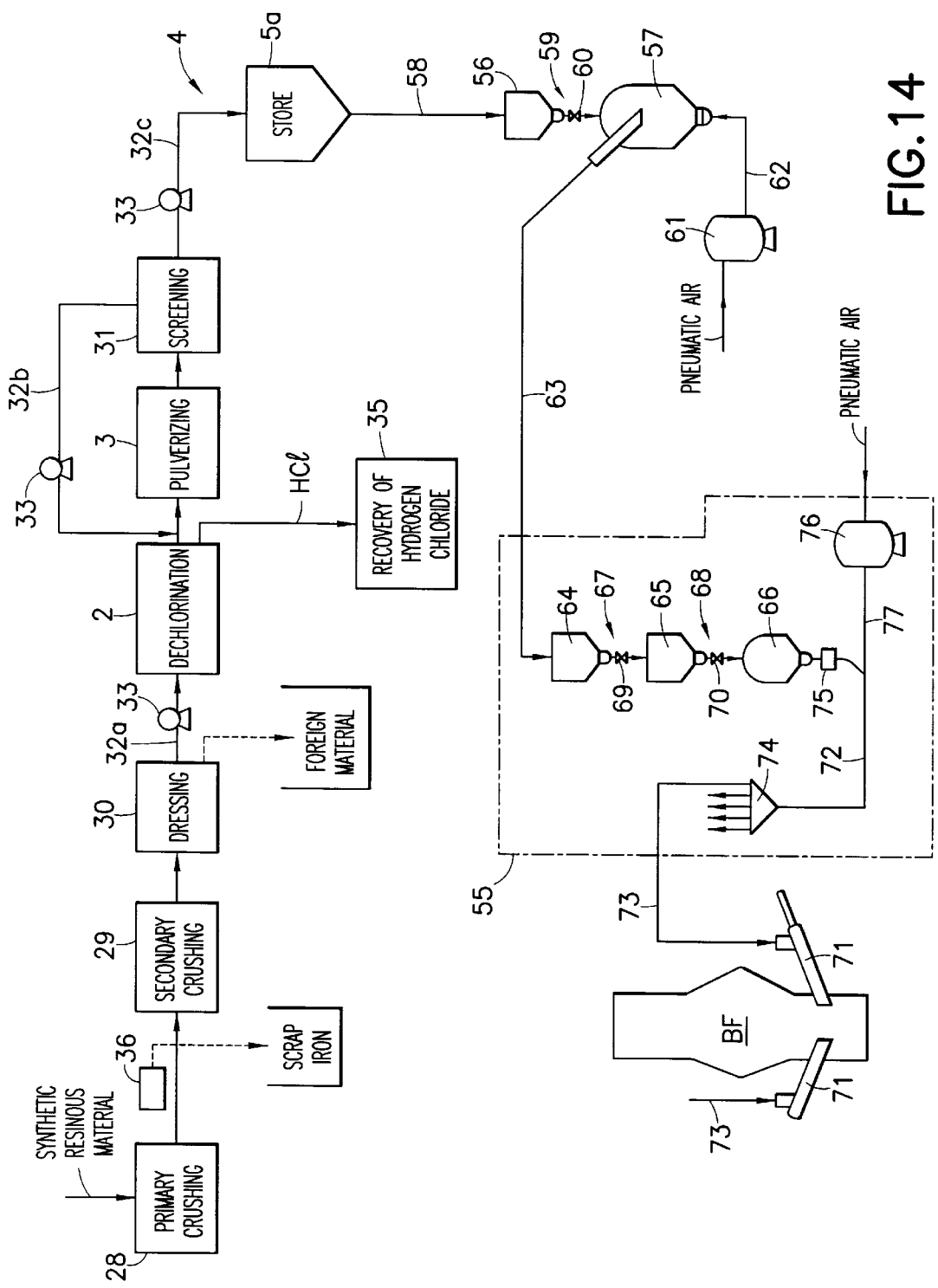
FIG. 14 is a schematic diagram illustrating another embodiment of a method and apparatus for processing in accordance with the present invention.

FIG. 14 is another embodiment of the method and the apparatus in accordance with the present invention, in which the supply means 4 is provided with a first storage silo 5*a* in which particulate synthetic resinous material from the processing line is reserved, and a blowing station 55 for pneumatically supplying the particulate synthetic resinous material from the first storage silo 5*a* to a blowing section such as a tuyere section of a blast furnace (hereinafter the blowing sections will be described with reference to the tuyere section of the blast furnace).

As the configuration of the processing line in this embodiment is similar to that in FIG. 13, the same numerals are assigned and the detailed description will be omitted.

The fine particulate synthetic resinous material passed through the screen classifier 31 is transferred to the first storage silo 5*a* through a transfer means 32*c*.

A service tank 56 for temporarily storing the particulate synthetic resinous material fed from the first storage silo 5*a* and a lift tank 57 for receiving the particulate resinous material fed from the service tank 56 and for pneumatically transferring the material to the blowing station 55 are provided between the first storage silo 5*a* and the blowing station 55.

The particulate synthetic resinous material is fed from the first storage silo 5*a* to the service tank 56 through a transfer means 58. The transfer means 58 comprises, for example, quantitative take-out equipment, a transfer conveyor, and a spontaneous falling type transfer duct or transfer tube. The particulate synthetic resinous material is transferred from the service tank 56 to the lift tank 57 by a transfer means 59 which is composed of a spontaneous falling type transfer tube and provided with a cutoff valve 60 midway therein, which controls supply of the particulate synthetic resinous material and maintains the pressure in the lift tank.

The lift tank 57 is connected with an air supply tube 62 for supplying air from an accumulator 61. The particulate synthetic resinous material in the lift tank 57 is supplied into the blowing station through a pneumatic transfer tube 63 by means of air. The amount of the particulate synthetic resinous material pneumatically transferred is controlled by the pressure of the air fed into the lift tank 57.

The blowing station 55 is provided with a plurality of tanks so as to achieve continuous supply of the particulate synthetic resinous material to the tuyere of the blast furnace. In this embodiment, a secondary storage silo 64, a pressure equalizing tank 65 and a blowing tank 66 are provided in this order from the upstream side, and the pneumatic transfer tube 63 is connected to the second storage silo 64. The particulate synthetic resinous material is supplied from the second storage silo 64 to the pressure equalizing tank 66 through a transfer means 68, and from the pressure equalizing tank 66 to the blowing tank 66 through a transfer means 68, respectively. These transfer means 67 and 68 are composed of spontaneous falling type transfer tubes, and cutoff valves 69 and 70 for controlling supply of the particulate synthetic resinous material and maintaining pressure in the pressure equalizing tank 65 and blowing tank 66 are provided midway along the transfer means, respectively.

The particulate synthetic resinous material is fed from the blowing tank 66 to the tuyere section 71 of a blast furnace BF through a pneumatic tube branch 73 which connects the air tube 72 and the tuyere section (in the drawing numeral 74 represents a distributor for the pneumatic tube branch 73). The air tube 72 is provided with a fluidization installation 75 for mixing the particulate synthetic resinous material fed from the tank with gas to fluidize the material at the outlet side of the blowing tank. The fluidization installation 75 also controls supply of the particulate synthetic resinous material. The air tube 72 is connected to an air supply tube 77 from an accumulator 76 to supply air. The amount of the particulate synthetic resinous material pneumatically transferred from the blowing tank 66 is controlled by adjusting the pressure in the blowing tank 66 by, for example, a booster means, and by controlling the flow rate of pneumatic transfer gas from the accumulator 76, if necessary.

The conditions of pneumatic transfer of the particulate synthetic resinous material into the blast furnace were as follows:

Pneumatic transfer gas: air

Solid-gas ratio: 4.5 kg/kg

During processing of the synthetic resinous material and supplying to the blast furnace, no problems occurred in operation of th e blast furnace, and no supply troubles such as clogging of the particulate synthetic resinous material were substantially found at the take-up section of the silo and in the pneumatic tube.

In accordance with the present invention as described above, waste synthetic resinous material such as plastic can be used as a fuel for furnaces and a reducing agent for an iron source without problems, i.e., harmful gas generation while burning chlorine containing polymeric resins, and therefore, large amounts of synthetic resinous waste can be usefully disposed.

TABLE 1

|  | Operation Example 1 | Operation Example 2 | Operation Example 3 | Operation Example 4 | Operation Example 5 |
| --- | --- | --- | --- | --- | --- |
| Feeding rate (t/hr) | 4.58 | 4.13 | 8.40 | 12.55 | 16.80 |
| Composition of waste synthetic resinous material (%) | | | | | |
| Polyethylene | 63.57 | 56.45 | 48.03 | 47.77 | 56.57 |
| Polypropylene | 19.29 | 19.41 | 28.74 | 25.65 | 19.33 |
| Polystyrene | 10.31 | 5.90 | 4.97 | 3.88 | 5.85 |
| PET | 2.00 | 0.00 | 1.19 | 1.26 | 0.00 |
| ABS | 1.00 | 0.00 | 0.76 | 2.24 | 0.00 |
| PVC | 1.34 | 10.73 | 10.40 | 10.97 | 10.77 |
| Miscellaneous | 0.00 | 2.83 | 2.15 | 4.04 | 2.79 |
| Inorganic compounds | 4.50 | 4.50 | 3.00 | 3.00 | 4.50 |

EXAMPLE

Synthetic resinous material containing chlorine containing polymeric resins shown in Table 1 was fed into an apparatus for disposal of the synthetic resinous material in accordance with the present invention, shown in a flow chart in FIG. 13 which was provided with a chlorine removal installation shown in FIG. 8, into particulate synthetic resinous material having a particle size of 6 mm or less, temporarily reserved in a storage silo, pneumatically transferred to a blast furnace through a pneumatic transfer tube system, and blown into the furnace with finely powdered coal through a tuyere section.

The composition of the particulate synthetic resinous material after processing and the feeding rate into the blast furnace are shown in Table 2, and operation conditions of the blast furnace are shown in Table 3.

TABLE 2

|  | Operation Example 1 | Operation Example 2 | Operation Example 3 | Operation Example 4 | Operation Example 5 |
| --- | --- | --- | --- | --- | --- |
| Feeding rate (t/hr) | 4.41 | 3.71 | 7.49 | 11.26 | 14.99 |
| Components (%) | | | | | |
| C | 83.825 | 81.910 | 82.751 | 81.888 | 81.837 |
| H | 12.910 | 12.141 | 12.342 | 11.907 | 12.207 |
| O | 0.671 | 0.467 | 0.744 | 1.111 | 0.462 |
| N | 0.000 | 0.000 | 0.000 | 0.000 | 0.000 |
| S | 0.000 | 0.000 | 0.000 | 0.000 | 0.000 |
| Cl | 0.090 | 0.269 | 0.272 | 0.412 | 0.241 |
| Inorganic compounds | 2.504 | 5.213 | 3.891 | 4.681 | 5.252 |

TABLE 3

|  | Operation Example 1 | Operation Example 2 | Operation Example 3 | Operation Example 4 | Operation Example 5 |
| --- | --- | --- | --- | --- | --- |
| Tapping rate (t/day) | 10000 | 9000 | 9000 | 9000 | 9000 |
| Blowing air temp. (° C.) | 1150 | 1000 | 1000 | 1000 | 1000 |

TABLE 3-continued

|  | Operation Example 1 | Operation Example 2 | Operation Example 3 | Operation Example 4 | Operation Example 5 |
|---|---|---|---|---|---|
| Air blowing (Nm³/t · pig) | 1020 | 1074 | 1076 | 1071 | 1077 |
| Oxygen enriching rate (%) | 4 | 4 | 4 | 4 | 4 |
| Coke ratio (kg/t · pig) | 425 | 403 | 396 | 385 | 378 |
| Fine particulate coal rate (kg/t · pig) | 80 | 100 | 100 | 100 | 100 |
| Synthetic resin rate (kg/t · pig) | 10 | 10 | 20 | 30 | 40 |

Embodiment 2

Figure 15:
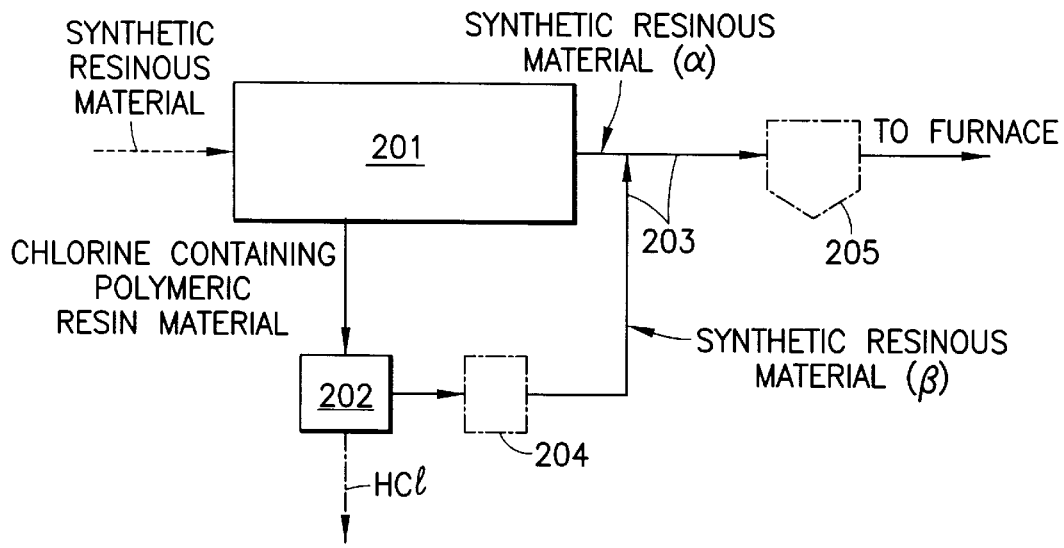
FIG. 15 is a schematic diagram illustrating an embodiment of a method and apparatus for processing in accordance with the present invention.

FIG. 15 is a schematic diagram of an embodiment of a method and apparatus for disposing of synthetic resinous material in accordance with the present invention, wherein numeral 201 represents a processing installation of the synthetic resinous material and numeral 202 represents an installation for eliminating chlorine.

Synthetic resinous material to be fed to a furnace is carried to the processing installation 201, and chlorine containing polymeric resins are separated from the synthetic resinous material therein to obtain synthetic resinous material ($\alpha$) not substantially containing the chlorine containing polymeric resins. For removing the chlorine containing polymeric resins, a gravity separation type or centrifugal separation type separating equipment is used as described below.

The processing installation 201 also performs a step for processing the synthetic resinous material into shapes suitable for supply into the furnace (generally, a particulate material), if necessary, other than separation of the chlorine containing polymeric resins. This step includes a step for pulverizing resinous materials, for example, when using block synthetic resinous material, or a step for pulverizing film resinous materials after heating the resinous materials followed by solidification with a reduced volume. This processing treatment can be performed before and/or after the separation step of the chlorine containing polymeric resins. In other words, the processing step of the synthetic resinous material and the separating step of the chlorine containing polymeric resins are performed in a given order in the processing installation, depending on synthetic resinous material characteristics.

The chlorine containing polymeric resins separated in the above-mentioned processing installation are delivered to a chlorine removal installation 202 for dechlorination. Dechlorination means to eliminate chlorine as hydrogen chloride from the chlorine containing resin by thermal decomposition, and synthetic resinous material ($\beta$) not substantially containing chlorine can be obtained thereby.

When heating chlorine containing polymeric resins such as vinyl chloride, dechlorination (as hydrogen chloride) of the resinous materials starts from near 250° C. and is completed at near 350° C. in general, and heating to a higher temperature starts thermal decomposition of hydrocarbon. Therefore, the above-mentioned heating treatment is preferably performed at a temperature of approximately 250 to 350° C., and more preferably approximately 300 to 350° C.

Types of chlorine removal installation 202 are not limited and include, for example, a screw extruding type with exterior heating, a pyrolysis furnace type, a fluid bed type and a rotary kiln type.

The resinous materials, which were heated to approximately 300 to 350° C. in the chlorine removal installation 202 and solidified after elimination of hydrogen chloride, have relatively porous structures. In addition, the film synthetic resinous material reduces its volume during the solidification.

Synthetic resinous material ($\alpha$) disposed in the processing installation 201 and synthetic resinous material ($\beta$) subjected to dechlorination in the chlorine removal installation 202 are supplied to the furnace by a supply means 203. The supply means 203 may be a continuous type (for example, a transfer conveyer or a pneumatic tube) or a batch type. When synthetic resinous material ($\beta$) disposed in the chlorine removal installation 202 is not sufficiently pulverized in the installation, a processing installation 204 such as a pulverizer may be provided to pulverize the resinous materials, if necessary. Such a processing installation may be provided as an internal mechanism of the chlorine removal installation 202, for example, a configuration such that the synthetic resinous material immediately after dechlorination is pulverized while cooling with water.

On the other hand, hydrogen chloride exhausted from the chlorine removal installation 202 may be fed to neutralization equipment to react with alkaline or alkaline earth materials, or may be fed to, for example, a facility for recovering hydrochloric acid (a hydrochloric acid recovery facility) from the hydrogen chloride gas.

The above-mentioned synthetic resinous materials ($\alpha$) and ($\beta$) are fed to the furnace as a fuel or a reducing agent for an iron source in the case of the blast furnace. The synthetic resinous material fed to the furnace may be temporarily reserved in a storage hopper 205 as described in the drawing, during transfer by means of the supply means 203.

Figure 16:
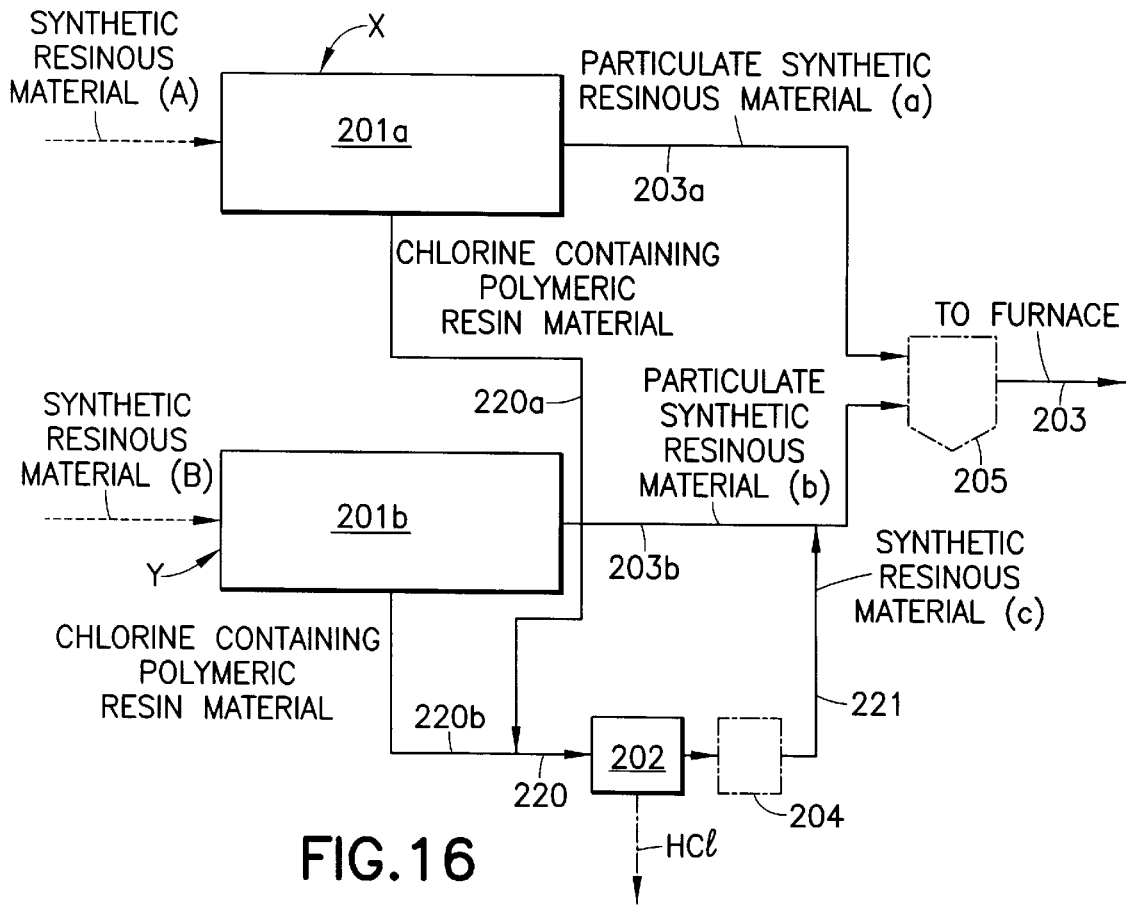
FIG. 16 is a schematic diagram illustrating another embodiment of a method and apparatus for processing in accordance with the present invention.

FIG. 16 is a conceptual view of another embodiment of the method and apparatus for disposing of synthetic resinous material in accordance with the present invention. This disposal method includes that the synthetic resinous material to be fed to the furnace be classified into synthetic resinous material (A) essentially consisting of film synthetic resinous material and other synthetic resinous material (B) (essentially consisting of block synthetic resinous material) and these are fed to their respective processing lines to be pulverized by different processes.

Synthetic resinous material (A) may contain any synthetic resinous material, having inferior flowability and transfer characteristics, for example, cellular plastics, other than the film synthetic resinous material.

Although the film synthetic resinous material is not limited, a synthetic resinous film having a thickness of 100 $\mu$m or less exhibits particularly low flowability and transfer characteristics according to the present inventors experimental results. Thus, a synthetic resinous film having a thickness of 100 $\mu$m or less is preferably classified as synthetic resinous material (A) within the range capable of classification. It goes without saying that the present invention is not limited to such a classification standard, and the synthetic resinous material (A) may include thicker synthetic resinous material such as PET bottles, as well as ultrathin films such as polyethylene films. Whether a synthetic resinous material is classified to synthetic resinous material (A) or not is determined depending on the thickness, composition of the synthetic resinous material, material quality (for example, any materials other than synthetic resins are included or not included), and shape and form. In contrast, synthetic resinous material (B) essentially consists of block synthetic resinous materials such as plates, but is not limited to this.

In a word, in consideration to flowability and transfer characteristics of collected synthetic resinous material, those having extremely poor flowability and transfer characteristics in an as-pulverized state, such as polyethylene, are classified as synthetic resinous material (A), those having superior flowability and transfer characteristics, such as block plastics, are under synthetic resinous material (B), and other materials may be classified into synthetic resinous material (A) or (B) in view of flowability and transfer characteristics.

In view of the entire disposal system, it is not always necessary that all the film synthetic resinous material among synthetic resinous material to be fed to the furnace be strictly classified to synthetic resinous material (A) and all the block synthetic resinous materials be strictly classified to synthetic resinous material (B). Further, it is difficult to strictly classify waste in practical view. Thus, it is allowable that the block synthetic resinous materials and the like and the film synthetic resinous materials and the like be included in synthetic resinous material (A) and synthetic resinous material (B), respectively, to some extent.

In FIG. 16, X and Y represent a processing line for synthetic resinous material (A) essentially consisting of film synthetic resinous materials and a processing line for synthetic resinous material (B) essentially consisting of block synthetic resinous materials, respectively.

Processing lines X and Y perform a step for separating chlorine containing polymeric resins from synthetic resinous materials (A) and (B) in their respective processing installations 201*a* and 201*b*, and a step for processing the synthetic resinous materials (A) and (B) into particulate synthetic resinous materials (a) and (b), which are fed to a furnace, such as a blast furnace, through supply means 203*a*, 203*b* and 203.

An appropriate means may be employed for supplying particulate synthetic resinous material (a) and particulate synthetic resinous material (b) into the furnace, for example, a method for blowing the materials into the furnace after being reserved in the storage hopper 205 midway in the supply means 203 as described in the drawing, a method for blowing the materials into the furnace after mixing midway in the supply means 203 without being reserved in the storage hopper, a method for separately supplying these materials and mixing them immediately before blowing, and a method for separately supplying and blowing them into the furnace.

As described above, the processing installation in each processing line performs a step of pulverizing synthetic resinous material and a step of separating the chlorine containing polymeric resins in a given order depending on synthetic resinous material characteristics.

The chlorine containing polymeric resins separated in each processing line X or Y are fed to the chlorine removal installation 202 through feeding means 220*a*, 220*b* and 220 for dechlorination to obtain synthetic resinous material (c) not substantially containing chlorine. The synthetic resinous material (c) is pulverized with a processing installation, if necessary, and then fed to the furnace through the supply means 221.

The above-mentioned supply means 203*a*, 203*b*, 203, 220*a*, 220*b*, 220 and 221 may be of continuous type (for example, a transfer conveyer and a pneumatic tube) or batch type.

Figure 17:
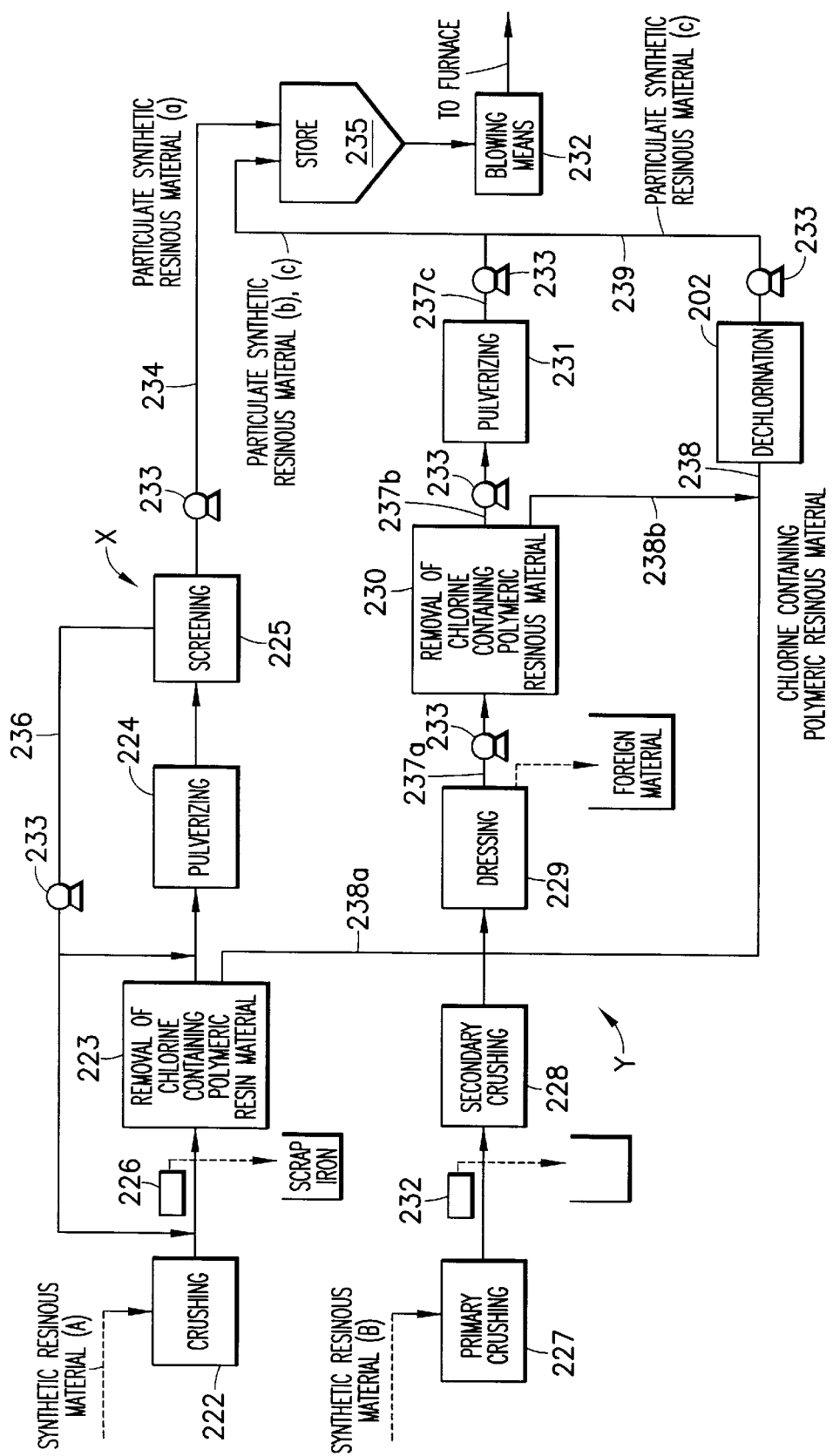
FIG. 17 is a schematic diagram illustrating a detailed embodiment of the method and apparatus described in FIG. 16.

FIG. 17 shows a more detailed configuration of the method and apparatus shown in FIG. 16, in which the processing line X processes the synthetic resinous material (A) to a reduced volume of particulate synthetic resinous material (a) by melting or partial melting with heat and solidification, while the processing line Y pulverizes the synthetic resinous material (B) to particulate synthetic resinous material (b).

In the processing line X, the synthetic resinous material (A) is pulverized with the pulverizer 222, if necessary, and fed to separating equipment 223 by a conveyor carrier or the like to separate chlorine containing polymeric resins such as vinyl chloride and vinylidene chloride from the synthetic resinous material (A).

Since the chlorine containing polymeric resins such as vinyl chloride have larger specific gravities compared to other synthetic resins (specific gravity of vinyl chloride: near 1.16 to 1.55, compared to specific gravity of polyethylene: near 0.91 to 0.96 and specific gravity of polypropylene: near 0.89 to 0.91), the separating equipment 23 generally separates the chlorine containing polymeric resins from the synthetic resinous resins (A) by means of a specific gravity separation process or a centrifugal separation process using a liquid such as water. Scrap iron is removed from the synthetic resinous material by a magnetic separator 226 (an installation for magnetically attracting scrap iron and the like for removal) midway in the conveyer transfer described above. Pulverization with the pulverizer 222 is not always necessary when the synthetic resinous material (A) is pulverized with a particulate solidifying installation described below. In such a case, the pulverizer 222 may be omitted.

Figure 18:
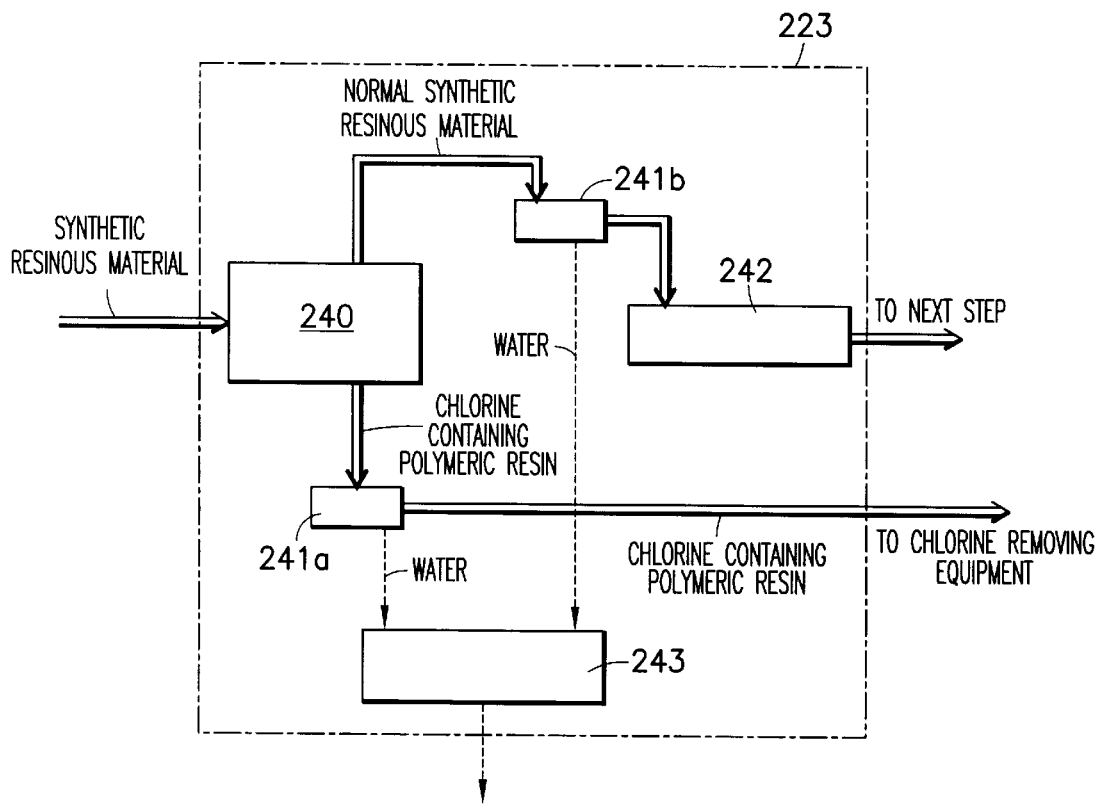
FIG. 18 is a schematic diagram illustrating an embodiment of separating equipment for chlorine containing polymeric resins.

FIG. 18 shows an embodiment of separating equipment of a specific gravimetry separation type, in which synthetic resinous material (A) is placed in a separation vessel 240 containing water to classify chlorine containing polymeric resins which sink in the vessel and other synthetic materials which float on the water. The sunk chlorine containing polymeric resins are removed from the vessel by an appropriate removal means, and carried on a screen 241*a* to remove water before being transferred out of the system. On the other hand, the floating resinous materials in the vessel other than the chlorine containing polymeric resins are removed from the vessel by an appropriate means, carried on a screen 241*b* to remove water, dried with drying equipment 242 and fed to the next process. In FIG. 18, numeral 243 represents a drainage tank for draining water separated by the screens 241*a* and 241*b*.

Figure 19:
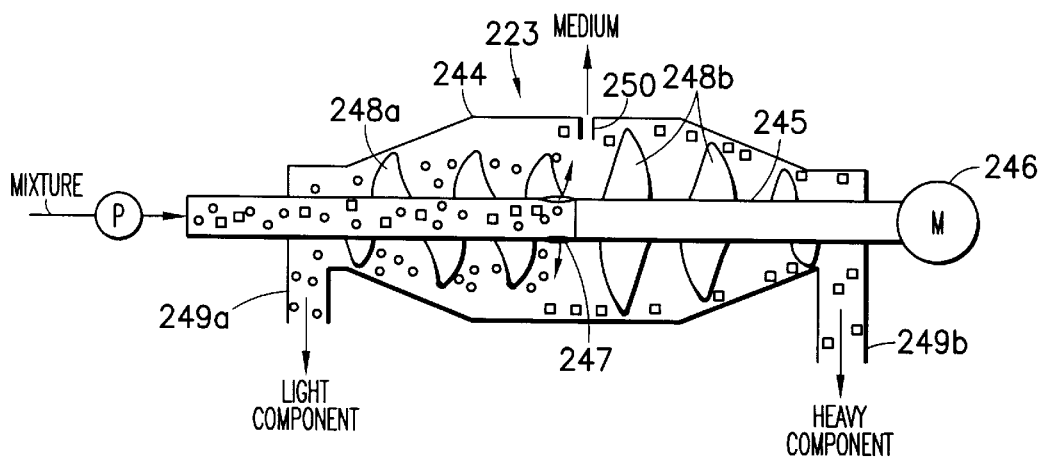
FIG. 19 is a schematic diagram illustrating another embodiment of separating equipment for chlorine containing polymeric resins.

FIG. 19 is a configurational embodiment of separating equipment 223 of a centrifugal separation type. This installation comprises a cylindrical or spindle hollow main body 244, an inner tube 245 with a screw rotatably provided along the longitudinal direction in the main body 244, and a motor 246 for rotationally driving the inner tube. In this installation, a mixture of synthetic resinous materials with a liquid media such as water are fed from one end of the inner tube 245 rotating at high speed. The mixture is spewed out from openings provided in the center of the inner tube along the longitudinal direction into the inner space of the main body 244 by means of centrifugal force, and resinous materials are separated into a heavy component (chlorine containing polymeric resins) having a specific gravity larger than that of the liquid media and a lighter component (other synthetic resinous materials) having a specific gravity smaller than that of the liquid media. Since only the heavy component among the synthetic resinous material is collected on the inner wall of the main body 244 by the centrifugal force, the light component and the heavy component are separated along the radial direction of the main body 244.

The inner tube 245 is provided with a screw 48a for transferring the light component at a first half before the openings 247 and a screw 248b for transferring the heavy component at a second half after the opening 248. The directions of these screws 248a and 248b are opposite to each other, and these screws 248a and 248b carry the synthetic resinous material towards their respective ends of the main body while the inner tube 245 rotates. That is, the light component of synthetic resinous material are carried to one end of the main body 244 by a screw 248a with a relatively shorter blade and removed from an outfall 249a. On the other hand, the heavy component of synthetic resinous material collected on the inner wall of the main body 244 are carried to the other end of the main body 244 by a screw 248b with a blade extending to near the inner wall of the main body 244 and removed from an outfall 249b. The liquid medium such as water is exhausted through an outfall 250 provided in the center of the main body 244.

Such an installation enables separation of the synthetic resinous material into a heavy component (chlorine containing polymeric resins) and a light component (other synthetic resinous materials) and removal of these components, both having very small water contents.

As described above, after the chlorine containing polymeric resins are removed with the separating equipment 223, the synthetic resinous material (A) is fed into a particulate solidifying installation 224 and processed to a reduced volume of particulate synthetic resinous material (a).

In the particulate solidifying installation 224, solidification with volume reduction and pulverization of the synthetic resinous material (A) is performed to obtain particulate synthetic resinous material (a) by any one of the following methods.

(1) A method for heating the synthetic resinous material (A) to melt followed by cooling to solidify, and for cutting or pulverizing the solidified synthetic resinous material.

(2) A method for obtaining particulate synthetic resinous material (a) by cutting or pulverizing the synthetic resinous material (A) (the cutting or pulverizing process may be performed by the pulverizer 222 instead of the particulate solidifying installation 224), partially melting the cut or pulverized synthetic resinous material with heat or frictional heat, solidifying and shrinking the partially melted synthetic resinous material by rapid cooling wherein the synthetic resinous material is solidified to particulate material or the solidified material is pulverized.

(3) As an embodiment of method (2), a method for obtaining the particulate synthetic resinous material (a) by cutting or pulverizing synthetic resinous material (A) with a rotation blade rotating at high speed while partially melting the materials with frictional heat due to cutting or pulverization, and solidifying and shrinking by rapidly cooling the partially melted synthetic resinous material by spraying water wherein the synthetic resinous material is solidified to a particulate material or solidified materials are pulverized.

Among these methods, a typical example of the method (1) includes perfect melting of synthetic resinous material (A), extrusion of the melt materials to a rod with an extruder, and cutting the rod to a particulate material. Other various methods can also be applied to the invention.

In contrast, the methods (2) and (3) include solidification with shrinkage of the partially melted synthetic resinous material (A) by rapid cooling by means of spraying water wherein the partially melt material is solidified with shrinkage to a particulate material or the solidified material is pulverized to obtain particulate synthetic resinous material (a). The present inventors discovered that particulate synthetic resinous material (a) obtained by the methods (2) and (3) and particularly by the method (3) exhibit very excellent flowability and transfer characteristics compared to the film synthetic resinous material and even to pulverized block synthetic resinous material, and exhibit excellent flammability, and the transfer characteristics and flammability of the entire synthetic resinous material can be further improved by using these materials with pulverized block synthetic resinous material. Therefore, in the process in accordance with the present invention, it is the most preferable that the synthetic resinous material (A) be solidified with shrinkage to or solidified with shrinkage followed by pulverizing to a particulate material by means of the method (2) or (3) with the particulate solidifying installation 224 to obtain particulate synthetic resinous material (a).

Figure 20:
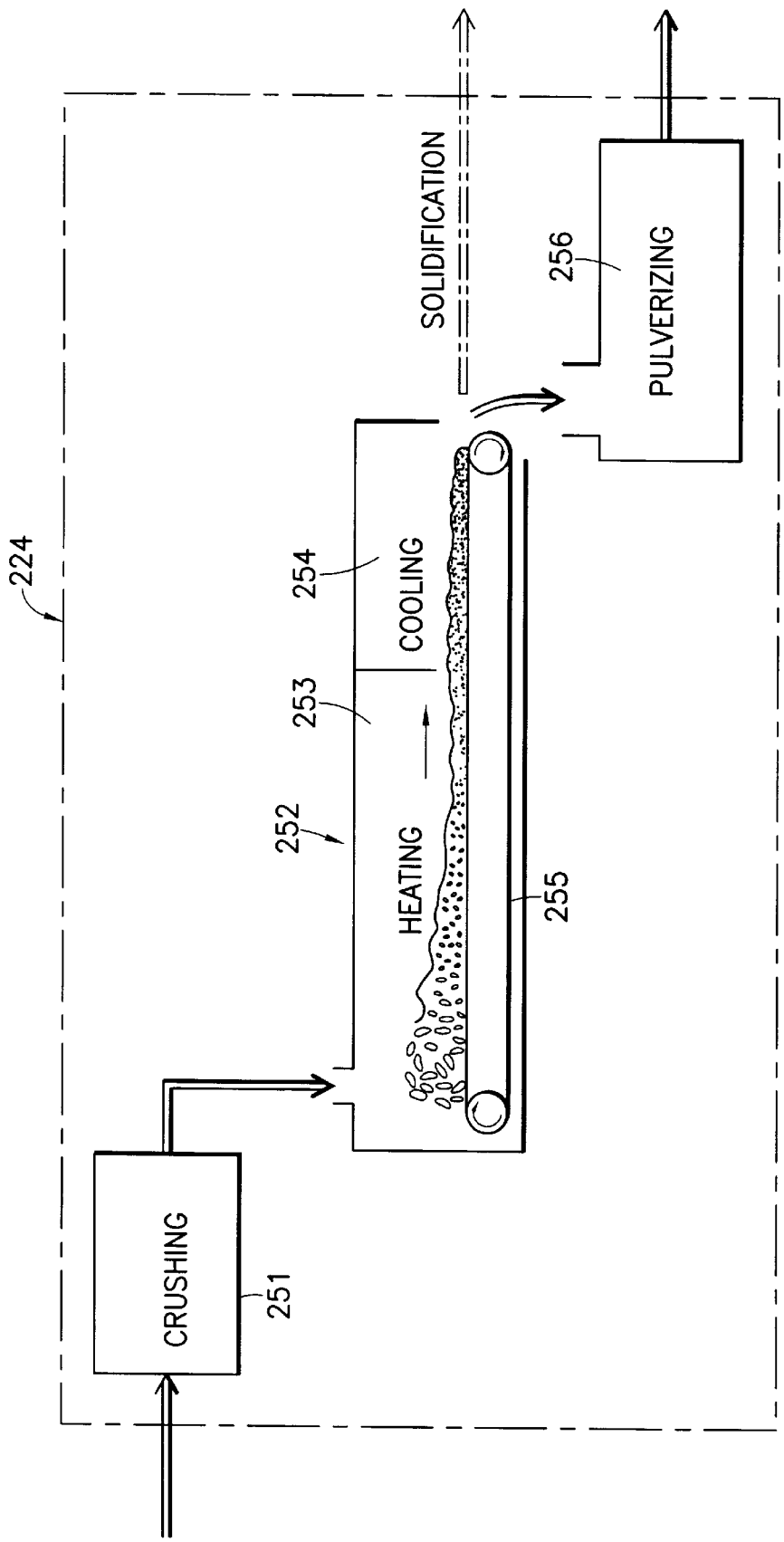
FIG. 20 is a schematic diagram illustrating an embodiment of a method for solidifying and shrinking followed by pulverizing synthetic resinous material (A).

FIG. 20 shows an embodiment for solidifying to a particulate material or continuously performing solidification with shrinkage and pulverization by means of the method (2), in which synthetic resinous material (A) placed into a particulate solidifying installation 224 is pulverized with a pulverizer 251, and fed into a volume reducing solidifying installation 252. In the volume reducing solidifying installation 252, synthetic resinous material (A) is continuously transferred to a heating chamber 253 and a cooling chamber 254 with transfer equipment 255 (a transfer belt or the like), to be partially melted in the heating chamber 253 by means of gas heating, gas indirect heating or electric heating, and then rapidly cooled in the cooling chamber 254 by means of water spraying for solidifying and shrinking. The synthetic resinous material can be solidified with shrinkage to a particulate material by appropriately selecting a pulverized state of the synthetic resinous material (A) and a supply state into the heating chamber. Therefore, according to this method, particulate synthetic resinous material (a) is obtainable by solidifying and shrinking.

In contrast, in a method in which a part or all of the synthetic resinous materials are not solidified with shrinkage, a solidified synthetic resinous material with shrinkage is transferred from the volume reducing solidifying installation 252 to a pulverizer 256 which pulverizes the resinous materials to particulate synthetic resinous material (a).

Since the resulting particulate synthetic resinous material (a) is those in which pulverized film synthetic resinous material is solidified with shrinkage from the partial melt to a particulate material or solidified with shrinkage followed by pulverizing, the materials have porous characteristics compared to a pulverized block synthetic resinous material and thus a large specific area, are not angular different from the pulverized block synthetic resinous material but rounded on the whole. Thus, the materials exhibit excellent flammability and flowability.

Figure 21:
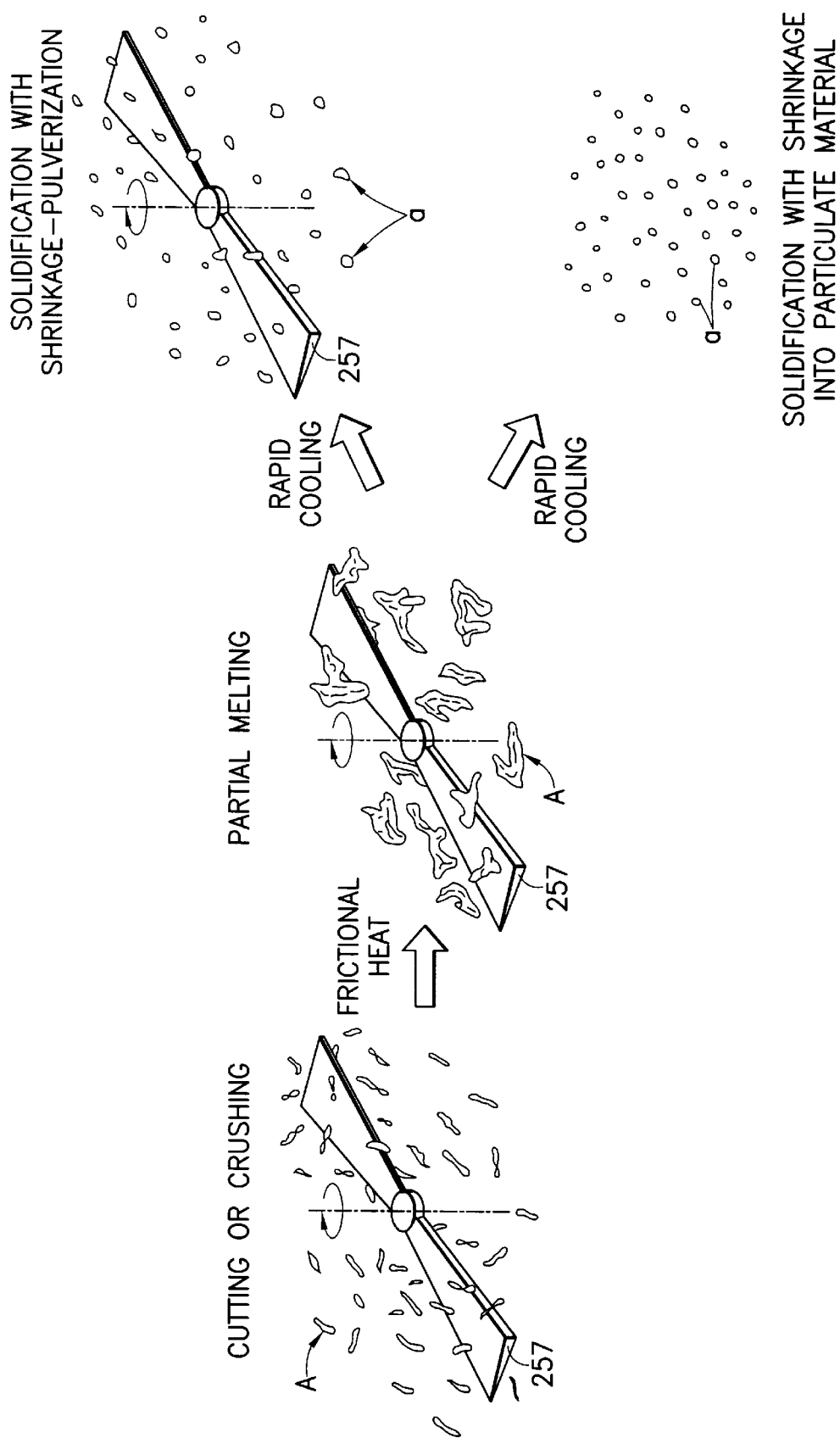
FIG. 21 is a schematic diagram illustrating another embodiment of a method for solidifying and shrinking followed by pulverizing synthetic resinous material (A).

FIG. 21 schematically shows the principle of solidifying and shrinking into a particulate material or solidifying and shrinking followed by pulverization which is performed according to the above-mentioned method (3), in which synthetic resinous material (A) is cut or crushed with a blade 257 rotating at a high speed, and simultaneously partially melted by means of the friction heat formed by cutting or crushing. Then the partially melted synthetic resinous material is solidified with shrinkage by rapidly cooling from the above temperature by spraying water wherein particulate synthetic resinous material (a) is obtained by solidifying and shrinking into a particulate material or solidifying and shrinking followed by pulverizing with the blade 257. In this method, the whole treatment including the crushing (or cutting) of the synthetic resinous material, partial melting and pulverization after solidification with shrinkage (no pulverization is required when solidifying and shrinking to a particulate material by rapid cooling) is performed with the blade 257 rotating at a high speed by batch processing. Therefore, a series of treatment "crushing (or cutting)—partial melting—solidification with shrinkage into a particulate material by rapid cooling" or "crushing (or cutting)—partial melting—solidification with shrinkage by rapid cooling—pulverization" can be completed at a short time period. Further, since the synthetic resinous material is partially melted during crushing (cutting) and high speed agitation and thus can be rapidly cooled, particulate synthetic resinous material (a) having preferable specific surface area and particle shape can be obtained. Further, since crushing (or cutting), partial melting and pulverization after solidification with shrinkage are performed by means of only the revolving blade 257, the method has advantages in view of facility and operation cost.

Also in the above-mentioned method (3), the synthetic resinous material can be solidified with shrinkage into a particulate material by appropriately selecting the crushing state of the synthetic resinous material (A) and a feeding state to the rotation blade. Thus, according to this method, particulate synthetic resinous material (a) can be substantially obtained by solidifying and shrinking without the following pulverization by means of the revolving blade. In contrast, in the method not solidifying and shrinking a part or all of the synthetic resinous materials to particulate materials, particulate synthetic resinous material (a) can be obtained by means of pulverization using the revolving blade as described above.

In the above methods (2) and (3), the temperature for partially melting the synthetic resinous material (A) depends on the type and shape of the synthetic resinous material. For example, in view of the material, the temperature ranges between approximately 105 and 115° C. for low density polyethylene, and near 128° C. for medium density polyethylene. Therefore, the temperature is appropriately determined depending on the type, content and shape of synthetic resins contained in synthetic resinous material (A).

The resulting particulate synthetic resinous material (a) is shifted with a screen classifier 225 to deliver only particles smaller than a given size (for example, 6 mm) to a storage silo 235 through a passage 234 as a feeding means. In this embodiment, the passage 234 consists of a pneumatic tube (in the drawing, numeral 233 represents a fan), and the particulate synthetic resinous material is pneumatically transferred into the storage silo 235. On the other hand, a particulate synthetic resinous material larger than the given size is returned to the inlet side of the transfer line of the separating equipment 223 or the particulate solidifying installation 224 through a passage 236 of a pneumatic tube (in the drawing, numeral 233 represents a fan) in order to feed them again into the separating equipment 223 or the particulate solidifying installation 224 with together synthetic resinous material (A).

The rough particulate synthetic resinous material can be returned to an appropriate position, and may be supplied to the processing line Y depending on the situation. When supplying to the processing line Y, the materials can be fed to an appropriate position (generally a transfer line) of the inlet side of a primary crusher 227, between the primary crusher 227 and a secondary crusher 228, between the secondary crusher 228 and a selector 229, and between the selector 229 and a pulverizer 231. Alternatively, the rough particulate synthetic resinous material may be removed from the system to directly feed to other processes (for example, supply through the tops of blast furnaces and scrap melting furnaces, direct supply into coke furnaces and sintering furnaces).

On the other hand, in the processing line Y, after the synthetic resinous material (B) is rough crushed (for example, to a particle size of approximately 50 mm) in the primary crusher 227, fed to the secondary crusher 228 with a conveyor or the like, and crushed again (for example, to a particle size of approximately 20 mm). Scrap iron is removed from the synthetic resinous material (B) after primary crushing by a magnetic separator 232 (an installation for magnetically attracting scrap iron and the like to remove) midway the conveyor.

The synthetic resinous material (B) after secondary crushing is fed into the selector 229 through a conveyor to remove foreign matter such as metal, sand and stone by air selection or the like. The materials are fed to separating equipment 230 through a passage 237*a* to separate chlorine containing polymeric resins from the synthetic resinous material (B). The process and configuration of the separating equipment 230 are substantially the same as the above-mentioned separating equipment 223, and thus the description will be omitted. The position of the separating equipment 230 is not limited to this embodiment, and it may be placed at an appropriate position upstream or downstream of the pulverizer 231, for example, between the first and secondary crushers 227 and 228, between the secondary crusher 228 and the selector 229, or at the outlet side of the pulverizer 231.

In the separating equipment 230, the synthetic resinous material (B) after removal of the chlorine containing polymeric resins is fed to the pulverizer 231 (a tertiary crusher) thorough a passage 237*b*, and pulverized to a given particle size (for example, 6 mm or less) to obtain particulate synthetic resinous material (b). The particulate synthetic resinous material (b) is fed to the storage silo 35 through a passage 237*c* as a supply means. In this embodiment, the passages 237*a*–237*c* consist of pneumatic tubes (in the drawing, numeral 233 represents a fan), so that the particulate synthetic resinous material (b) is pneumatically transferred to the storage silo 235.

On the other hand, the chlorine containing polymeric resins which are separated in the separating equipment 223 and 230 are fed to a chlorine removal installation 202 through supply means 238*a*, 238*b*, and 238, and subjected to dechlorination as described above to obtain synthetic resinous material (c) not substantially containing chlorine. The synthetic resinous material (c) is processed or crushed to a particulate material with a processing installation (not shown in the drawing) or a processing mechanism involved in the chlorine removal installation), and fed to the furnace through a passage 239 (a pneumatic tube). The supply means 238*a*, 238*b* and 238*c* may be either continuous types or batch types.

The mixture of the particulate synthetic resinous materials (a) and (b) and the synthetic resinous material (c) which are reserved in the storage silo 235 are transferred into a blowing means 232 by means of conveyor or pneumatic transfer, pneumatically transferred to a furnace such as a blast furnace through the blowing means 232, and blown into the furnace through a tuyere.

In the embodiment described in FIG. 17, the magnetic selector 232 is provided at only one point every processing line, but may be provided at a plurality of positions in the processing line.

The crushing method in each crusher (including the pulverizer 231) is appropriately determined, for example, cryogenic crushing of frozen synthetic resinous material is also applicable instead of usual mechanical crushing.

The inlet side of the processing installation may be provided with other equipment such as a yard drier for the transferred synthetic resinous material.

As described above, the content of the chlorine containing polymeric resins in the synthetic resinous material fed to the processing installation and the feeding ratio of the synthetic resinous material (A) essentially consisting of film synthetic resinous material to the other synthetic resinous material (B) change with time to some extent depending on the waste, and it may occur at a relatively short time period (for example, several hours to several dozen hours) that synthetic resinous material not containing chlorine containing polymeric resins is supplied or either of the synthetic resinous material (A) or (B) is supplied. In such a case, temporarily no chlorine containing polymeric resin will be supplied to the chlorine removal installation 202, or only the synthetic resinous material (A)—particulate synthetic resinous material (a) or the synthetic resinous material (B)—particulate synthetic resinous material (b) will be temporarily processed and supplied to the furnace. Further, either of the particulate synthetic resinous material (a) or (b) may be temporarily pneumatically transferred to the furnace for other reasons.

In the processing method described in FIG. 17, the particulate synthetic resinous materials (a) and (b) may be reserved in different silos and the like and pneumatically transferred through different passages.

When the synthetic resinous material essentially consists of only the chlorine containing resins, the materials may be directly fed to the chlorine removal installation without through a separation step in each processing line.

As described above, since the particulate synthetic resinous material (a), which was obtained by solidification with shrinkage into a particulate material or solidification with shrinkage followed by pulverization, are porous, have a large specific area, and are rounded on the whole, the materials have excellent flammability and flowability. The flammability, flowability and transfer characteristics of the entire particulate resinous materials fed to the furnace can be further enhanced by mixing these materials with the particulate synthetic resinous material (b). In detail, regarding flammability, when a mixture of the particulate synthetic resinous material (a) and the particulate synthetic resinous material (b) is blown into a furnace, the particulate synthetic resinous material (a) having excellent flammability rapidly burn and readily ignite the particulate synthetic resinous material (b), flammability of the entire synthetic resinous material blown into the furnace is significantly enhanced.

Further, regarding flowability and transfer characteristics, since the rounded particulate synthetic resinous material (a) having excellent flowability and transfer characteristics are contained, the materials act as lubricant for improving the flowability of the entire particulate synthetic resinous material. As a result, the flowability and transfer characteristics of the particulate synthetic resinous material are significantly improved.

Figure 22:
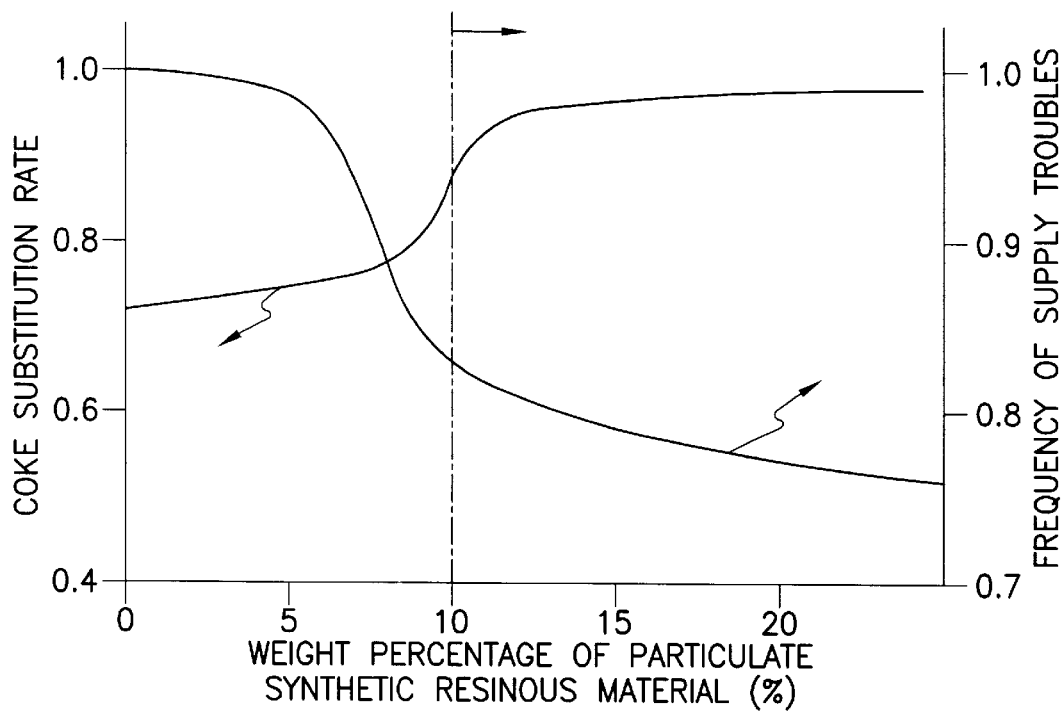
FIG. 22 is a graph illustrating correlation between the content of particulate synthetic resinous material (a) in the entire particulate synthetic resinous material and coke substitution rate or frequency of supply troubles.

In order to achieve such advantages, it is preferable that the content of the particulate synthetic resinous material (a) be 10 percent by weight or more in the entire particulate synthetic resinous material. FIG. 22 shows a correlation between the content by weight of the particulate synthetic resinous material (a) and transfer characteristics (frequency of supply troubles) or substitution rate of coke, in which particulate synthetic resinous material (a) with a particle size of 6 mm or less prepared by solidification with shrinkage followed by pulverization of film synthetic resinous material according to the above-mentioned method (3) and particulate synthetic resinous material (b) with a particle size of 6 mm or less prepared by pulverization of block synthetic resinous material (both particulate synthetic resinous materials have an angle of repose of 40 degrees) are mixed in various ratios, and the mixture is blown into a furnace through a tuyere. Frequency of the supply troubles and the substitution rate of the coke are determined as follows.

(A) Frequency of Supply Troubles

Frequency of supply troubles is set to "1" when only the particulate synthetic resinous material (b) (angle of repose: 40 degrees) with a particle size of 6 mm or less prepared by pulverizing block synthetic resinous material are supplied to the furnace, and the frequency of supply troubles of the mixture is represented by an index in comparison with the above frequency. Supply troubles were monitored by change in weight of the particulate synthetic resinous material in the storage silo, and it is judged that a constant weight for a given time (for example, 10 minutes) is a trouble (clogging at the take-out section in the silo or midway the pneumatic tube).

(B) Substitution Rate of Coke

Substitution rate=(a coke ratio reduced by blowing of particulate synthetic resinous material)/(a blowing ratio of the particulate synthetic resinous material) wherein the coke ratio reduced by blowing of particulate synthetic resinous material: kg/t·pig and the blowing ratio of the particulate synthetic resinous material: kg/t·pig.

FIG. 22 shows that a content of the particulate synthetic resinous material (a) of 10 percent or more in the entire particulate synthetic resinous material leads excellent flammability and transfer characteristics.

In order to control the content of the particulate synthetic resinous material (a), it is preferable that the particulate synthetic resinous material (a) and other particulate synthetic resinous materials be reserved in their respective storage silos and then mixed to a given content.

It is preferable that the particulate synthetic resinous materials (a), (b) and (c) be processed to a bulk density of 0.30 or more and an angle of repose of 40 degrees or less. Although a bulk density of 0.35 or more is proposed in conventional technologies as described above, a high bulk density in block synthetic resinous material causes an increased load in the crushing machine (a decreased life of the crushing blade), and some crushing machines may produce only crushed materials having a bulk density of less than 0.35. In contrast, the results of the present inventors investigation demonstrates that a bulk density of the particulate synthetic resinous material of 0.30 or more does not cause troubles, such as pressure loss, during pneumatic transfer of the particulate synthetic resinous material, that troubles, such as bridging of the particulate synthetic resinous material in the storage silo and clogging in the bend sections and near the valves of the pneumatic tubes, do not depend on the bulk density of the particulate synthetic resinous material, but greatly depends on the shape of the particulate synthetic resinous material, and that suppression of the troubles due to the shape has a correlation with the angle of repose of the particulate synthetic resinous material.

Figure 23:
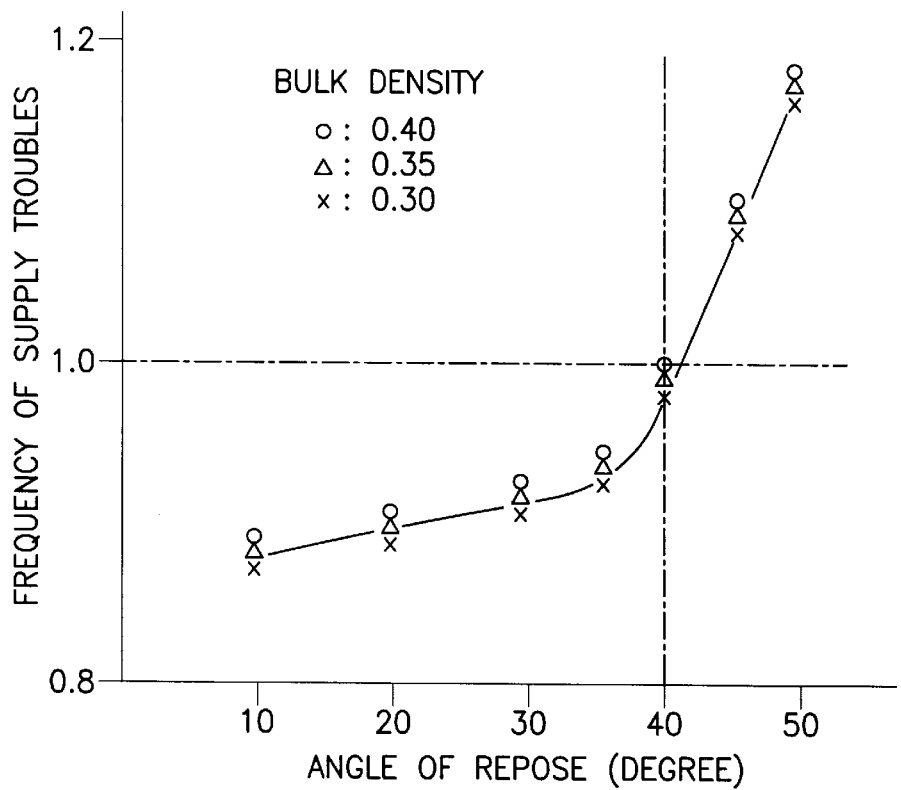
FIG. 23 is a graph illustrating correlation between the angle of repose and frequency of supply troubles in particulate synthetic resinous materials having different bulk densities obtained by pulverizing block synthetic resinous materials.

FIG. 23 shows correlation between the angle of repose and the frequency of the supply troubles such as bridging in the storage silo and clogging in the pneumatic tube regarding particulate synthetic resinous material having a particle size of 6 mm or less and different bulk densities prepared by pulverizing block synthetic resinous material. The frequency of supply troubles was evaluated as in FIG. 22.

FIG. 23 demonstrates that an angle of repose of 40 degrees or less can prevent such supply troubles regardless of the bulk density of the particulate synthetic resinous material.

Further, it is clarified that particulate synthetic resinous material having an angle of repose of 40 degrees or less can be prepared by solidifying and shrinking to a particulate material or solidifying and shrinking followed by pulverization in the above-mentioned methods (2) and (3) for the particulate synthetic resinous material (a). On the other hand, appropriate crushing processes for achieving an angle of repose of 40 degrees or less are applied to the particulate synthetic resinous material (a) prepared by solidifying with volume reduction followed by pulverization in the above-mentioned method (1), the particulate synthetic resinous material (a) prepared by solidifying and shrinking followed by pulverization according to a method other than the above methods (1) through (3), the particulate synthetic resinous material (b) prepared by crushing the particulate synthetic resinous material (B), and the particulate synthetic resinous material (c).

In the present invention it is preferable that the particle sizes of the particulate synthetic resinous materials (a) and (b) prepared by processing and the synthetic resinous material (c) be 10 mm or less, and more preferably 4 to 8 mm in view of flammability and the like.

The disposal method of synthetic resinous material in accordance with the present invention is applicable to various furnaces, such as blast furnaces, scrap melting furnaces and rotating kilns.

Of course, synthetic resinous material waste, which is capable of pneumatic transfer without modification because it does not contain chlorine containing polymeric resins and is a particulate material, can be fed to a furnace through a storage silo without performing the steps in accordance with the present invention. Examples of such waste include ion-exchange resin particles, synthetic resin pellets for molding, and synthetic resin beads for toys.

Example 1

Synthetic resinous material (A) essentially consisting of film synthetic resinous material and synthetic resinous material (B) essentially consisting of block synthetic resinous material were fed to the apparatus for processing synthetic resinous material in accordance with the present invention described in FIG. 17, at 1.60 t/hr and 2.98 t/hr, respectively, and processed to particulate synthetic resinous materials (a), (b) and (c). After these materials were mixed in the storage silo, the mixture was pneumatically transferred to a blast furnace and fed into the furnace together with fine particulate coal through a tuyere. Conditions for processing the synthetic resinous material and for operating the blast furnace were as follows:

(A) Conditions for Processing Synthetic Resinous Materials
 (A-1) Synthetic resinous material (A)
 After rough crushing and removal of chlorine containing polymeric resins in the processing line X in FIG. 17, the materials were processed to particulate synthetic resinous material (a) having a particle size of 6 mm or less by solidifying and shrinking followed by pulverizing by means of the above-mentioned method (3) and transferred to the storage silo.

(A-2) Synthetic resinous material (B)
 The materials were processed to particulate synthetic resinous material (b) having a particle size of 6 mm or less by a primary crushing, a secondary crushing, removal of chlorine containing polymeric resins and pulverizing in the processing line Y in FIG. 17 and transferred to the storage silo.

(A-3) Chlorine Containing Synthetic Resins
 The chlorine containing synthetic resins which were separated in the separating equipment in the processing lines X and Y were transferred to a screw extrusion type chlorine removal installation for dechlorination, pulverized to particulate synthetic resinous material (c) having a particle size of 6 mm or less and transferred to the storage silo.

(A-4) Blowing Particulate Synthetic resinous material into Blast Furnace
 The mixture of the synthetic resinous materials (a), (b) and (c) reserved in the storage silo was quantitatively taken up from the storage silo, transferred to the pneumatic transfer installation, and pneumatically transferred from the pneumatic transfer installation to the tuyere of the blast furnace to be fed into the furnace.

(B) Conditions for Operating Blast Furnace
 Tapping rate: 10,000 tons/day
 Coke ratio: 425 kg/t·pig
 Tuyere:
 Blowing rate of particulate synthetic resinous materials: 10 kg/t·pig
 Blowing rate of fine particulate coal: 80 kg/t·pig
 Air blowing: 1,020 Nm$^3$/t·pig
 Enriched oxygen rate: 4%
 Blowing air temperature: 1,150° C.

During processing of the synthetic resinous material and supplying to the blast furnace, no problems occurred in operation of the blast furnace, and no supply troubles such as clogging of the particulate synthetic resinous material were substantially found at the take-up section of the silo and in the pneumatic tube.

In this example on operation, the synthetic resinous materials fed to the processing lines X and Y contained approximately 9% of chlorine containing polymeric resins such as vinyl chloride. Approximately 99% of the chlorine containing polymeric resins were recovered in the separating equipment, and approximately 97% of chlorine in the chlorine containing polymeric resins was removed in the chlorine removal installation. Therefore, hydrogen chloride was not substantially detected in the top furnace gas collected during operation.

The total chlorine containing polymeric resins recovered in the processing lines x and Y were about 616 kg/hr and the chlorine content of the chlorine containing polymeric resins was about 35 wt % during operation. Thus, hydrogen chloride was removed at a dechlorination rate of about 142 kg/hr in the chlorine removal installation, and synthetic resinous material (carbonaceous residue) not substantially containing the chlorine containing polymeric resins was fed to the furnace at a rate of about 474 kg/hr.

Example 2

Synthetic resinous material (A) essentially consisting of film synthetic resinous material and synthetic resinous material (B) essentially consisting of block synthetic resinous material were fed to the apparatus for processing synthetic resinous material in accordance with the present invention described in the flow chart of FIG. 17, processed to particulate synthetic resinous materials (a), (b) and (c), mixed in the storage silo, pneumatically transferred to a blast furnace and fed into the furnace together with fine particulate coal through a tuyere. The synthetic resinous material fed to the processing step included thermoplastic resins such as polyethylene; polyethylene terephthalate (PET), ABS resins, PVC resins, phenol resins, and urethan resins; plasticizers such as diethyl phthalate; flame-retardants such as trimethyl phosphate; and fillers such as glass fiber.

Conditions for processing and feeding the synthetic resinous material in this example were as follows. The amounts and compositions of the synthetic resinous material fed to the processing lines X and Y and the chlorine containing polymeric resins separated in the processing lines X and Y and fed to the chlorine removal installation are shown in Tables 4 and 5, and the supply rates and compositions of the resulting particulate synthetic resinous material for blowing are shown in Tables 6 and 7, and operation conditions of the blast furnace are shown in Table 8.

(A) Conditions for Processing Synthetic Resinous Materials
  (A-1) Synthetic resinous material (A)
  The same as Example 1 except for the supply rate of the synthetic resinous material to the processing line X.
  (A-2) Synthetic resinous material (B)
  The same as Example 1 except for the supply rate of the synthetic resinous material to the processing line Y.
  (A-3) Chlorine Containing Synthetic Resins
  The chlorine containing synthetic resins which were separated in the separating equipment in the processing lines X and Y were transferred to a rotary kiln type chlorine removal installation described in FIG. 7 for dechlorination, pulverized to particulate synthetic resinous material (c) having a particle size of 6 mm or less and transferred to the storage silo.
  (A-4) Blowing Particulate Synthetic resinous material into Blast Furnace The mixture of the synthetic resinous materials (a), (b) and (c) reserved in the storage silo was quantitatively taken up from the storage silo, transferred to the pneumatic transfer installation, and pneumatically transferred from the pneumatic transfer installation to the tuyere of the blast furnace to be fed into the furnace under the following conditions.

Pneumatic transfer gas: air

Solid/gas ratio: 4.5 kg/kg

During processing of synthetic resinous material and supplying into the blast furnace, operation of the blast furnace was not disturbed and no supply troubles such as clogging of the particulate synthetic resinous material fed to the blast furnace occurred at the take-up section and in the pneumatic tube.

In the chlorine removal installation, chlorine was removed from the chlorine containing polymeric resins at a rate of 372 kg/hr in operation example 1, 394 kg/hr in operation example 2, 201 kg/hr in operation example 3 and 611 kg/hr in operation example 4, and resinous materials (resinous residue after dechlorination) each having a sufficiently reduced chlorine content shown in Tables 6 and 7 were fed to the furnace.

In accordance with the present invention as described above, waste synthetic resinous material such as plastic can be used as a fuel for furnaces and a reducing agent for an iron source without problems, i.e., harmful gas generation while burning chlorine containing polymeric resins, and therefore, large amounts of synthetic resinous waste can be usefully disposed.

TABLE 4

|  | Operation Example 1 | | | Operation Example 2 | | |
| --- | --- | --- | --- | --- | --- | --- |
|  | Line X | Line Y | Chlorine removal installation | Line X | Line Y | Chlorine removal installation |
| Feeding rate (t/hr) | 2.52 | 5.36 | 0.808 | 3.05 | 4.88 | 0.861 |
| Composition of waste synthetic resinous material (%) | | | | | | |
| Polyethylene | 67.00 | 59.00 | 4.25 | 53.00 | 46.20 | 3.42 |
| Polypropylene | 14.00 | 20.60 | 1.53 | 26.30 | 29.50 | 1.27 |
| Polystyrene | 3.00 | 6.00 | 1.18 | 1.20 | 6.80 | 0.95 |
| PET | 0.00 | 0.00 | 0.00 | 1.50 | 1.00 | 0.00 |
| ABS | 0.00 | 0.00 | 0.00 | 2.00 | 0.00 | 0.00 |
| PVC | 11.00 | 9.40 | 88.44 | 8.60 | 11.50 | 87.82 |
| Miscellaneous | 0.00 | 2.00 | 0.00 | 2.40 | 2.00 | 0.00 |
| Inorganic compounds | 5.00 | 3.00 | 4.60 | 5.00 | 3.00 | 6.54 |

TABLE 5

|  | Operation Example 3 | | | Operation Example 4 | | |
| --- | --- | --- | --- | --- | --- | --- |
|  | Line X | Line Y | Chlorine removal installation | Line X | Line Y | Chlorine removal installation |
| Feeding rate (t/hr) | 1.53 | 2.42 | 0.441 | 6.55 | 5.40 | 1.368 |
| Composition of waste | | | | | | |

TABLE 5-continued

|  | Operation Example 3 | | | Operation Example 4 | | |
| --- | --- | --- | --- | --- | --- | --- |
|  | Line X | Line Y | Chlorine removal installation | Line X | Line Y | Chlorine removal installation |
| synthetic resinous material (%) | | | | | | |
| Polyethylene | 64.00 | 52.00 | 4.64 | 50.50 | 44.80 | 3.79 |
| Polypropylene | 15.00 | 22.00 | 1.70 | 23.40 | 28.10 | 1.42 |
| Polystyrene | 3.00 | 7.60 | 1.23 | 1.20 | 6.80 | 1.15 |
| PET | 0.00 | 0.00 | 0.00 | 1.50 | 1.00 | 0.56 |
| ABS | 0.00 | 0.00 | 0.00 | 2.00 | 2.50 | 0.00 |
| PVC | 13.00 | 9.40 | 87.33 | 11.30 | 10.60 | 85.73 |
| Miscellaneous | 0.00 | 4.50 | 0.00 | 4.80 | 3.20 | 0.00 |
| Inorganic compounds | 5.00 | 4.50 | 5.10 | 5.30 | 3.00 | 7.35 |

TABLE 6

|  | Operation Example 1 | | Operation Example 2 | |
| --- | --- | --- | --- | --- |
|  | Lines X and Y | After dechlorination | Lines X and Y | After dechlorination |
| Feeding rate (t/hr) | 7.07 | 0.414 | 7.07 | 0.448 |
| Components (%) | | | | |
| C | 82.53 | 78.41 | 82.24 | 75.28 |
| H | 13.17 | 7.70 | 12.91 | 7.27 |
| O | 0.23 | 0.00 | 0.82 | 0.00 |
| N | 0.00 | 0.00 | 0.00 | 0.00 |
| S | 0.00 | 0.00 | 0.00 | 0.00 |
| Cl | 0.52 | 4.92 | 0.58 | 4.86 |
| Inorganic compounds | 3.53 | 8.95 | 3.43 | 12.57 |

TABLE 7

|  | Operation Example 3 | | Operation Example 4 | |
| --- | --- | --- | --- | --- |
|  | Lines X and Y | After dechlorination | Lines X and Y | After dechlorination |
| Feeding rate (t/hr) | 3.51 | 0.229 | 10.58 | 0.724 |
| Components (%) | | | | |
| C | 81.46 | 77.66 | 81.55 | 73.94 |
| H | 12.75 | 7.69 | 12.53 | 7.17 |
| O | 0.48 | 0.00 | 1.17 | 0.32 |
| N | 0.00 | 0.00 | 0.00 | 0.00 |
| S | 0.00 | 0.00 | 0.00 | 0.00 |
| Cl | 0.65 | 4.80 | 0.88 | 4.67 |
| Inorganic compounds | 4.64 | 9.82 | 3.86 | 13.88 |

TABLE 8

|  | Operation Example 1 | Operation Example 2 | Operation Example 3 | Operation Example 4 |
| --- | --- | --- | --- | --- |
| Tapping rate (t/day) | 9000 | 9000 | 9000 | 9000 |
| Blowing air temp. (° C.) | 1000 | 1000 | 1000 | 1000 |
| Air blowing (Nm³/t · pig) | 1074 | 1076 | 1071 | 1077 |
| Oxygen enriching rate (%) | 4 | 4 | 4 | 4 |
| Coke ratio (kg/t · pig) | 395 | 396 | 409 | 388 |
| Fine particulate coal rate (kg/t · pig) | 100 | 100 | 100 | 100 |
| Synthetic resin rate (kg/t · pig) | 20 | 20 | 10 | 30 |

Figure 24:
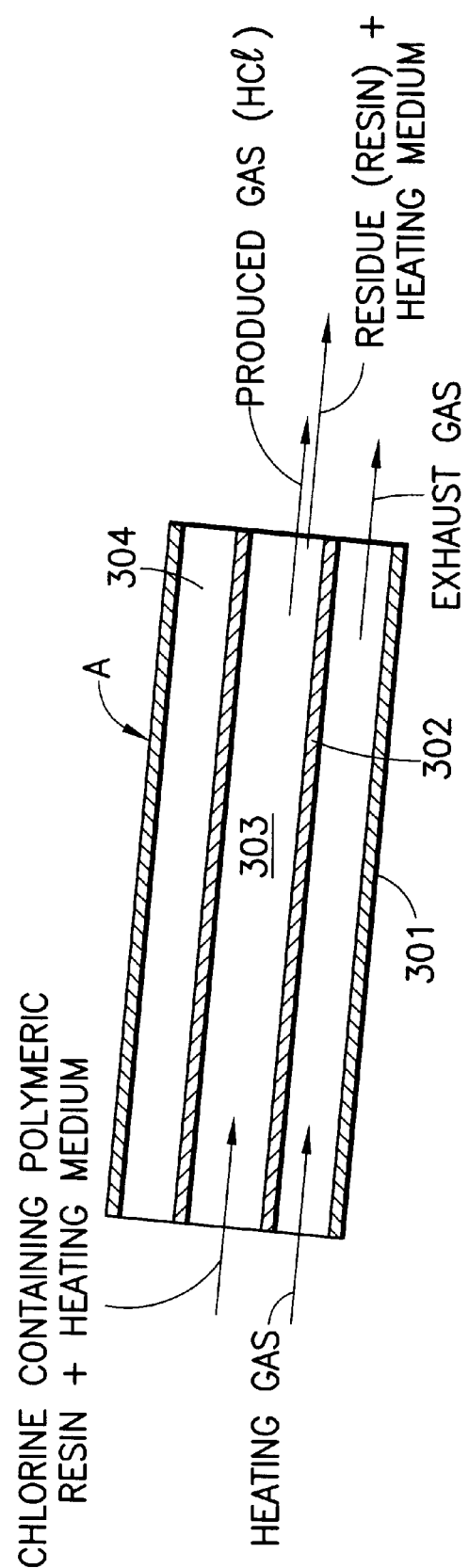
FIG. 24 is a longitudinal cross-sectional view illustrating an embodiment of an apparatus in accordance with the present invention.
Figure 25:
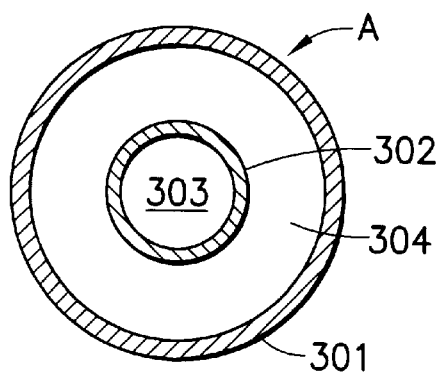
FIG. 25 is a transverse cross-sectional view of the apparatus shown in FIG. 24.

FIGS. 24 and 25 show an embodiment of an apparatus in accordance with the present invention, in which alphabet A represents an apparatus main body, numeral 301 represents an outer tube of the main body and numeral 302 represents an inner tube which is concentrically arranged inside the outer tube 301 along the longitudinal direction. The inside of the inner tube 302 is used as a passage 303 (a space for disposal) for the resinous material to be disposed and a space between the outer tube 301 and the inner tube 302 is used as a passage 304 for a heating gas.

EXAMPLE

Figure 26:
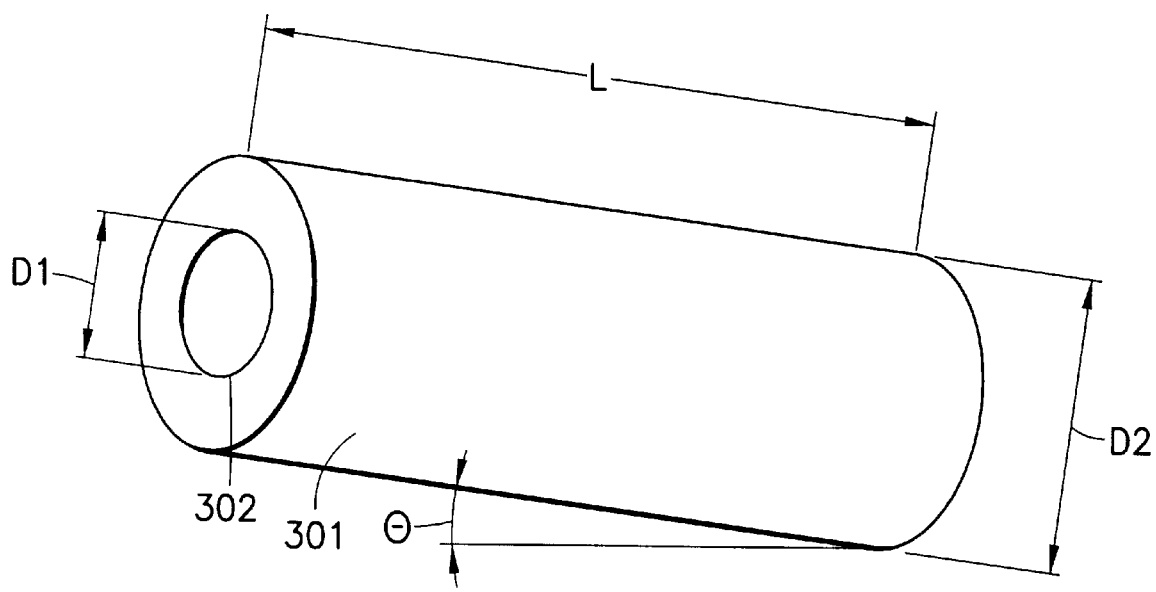
FIG. 26 is a schematic view of an apparatus in accordance with the present invention used in Examples.

Using the apparatus in accordance with the present invention shown in FIG. 26, dechlorination of a polyvinyl chloride resin was performed. Outline of the apparatus configuration was as follows:

[Apparatus configuration]

Size of kiln (inner diameter $D_2$ of outer tube×length): 600 mm$\phi$×3,000 mm

Size of inner tube (inner diameter $D_1$ of outer tube× length): 400 mm$\phi$×3,000 mm Tilt angle of apparatus main body $\theta$: 5 degrees In the examples, a polyvinyl chloride resin having a chlorine content of 35%, an ash content of 1.5% and a particle size of 10 to 20 mm was disposed together with a powdered coke heating medium having a particle size of 10 mm or less.

Dechlorination was performed under two different conditions, that is, a feeding rate of the polyvinyl chloride resin: 50 kg/hr and a feeding rate of the powdered coke: 20 kg/hr (referred to as Example 1), and a feeding rate of the polyvinyl chloride resin: 70 kg/hr and a feeding rate of the powdered coke: 10 kg/hr (referred to as Example 2). The rotation rate of the kiln was adjusted so that the polyvinyl chloride resin and the heating medium (powdered coke) stay for 15 minutes in the kiln. A small amount of carrier gas was fed into the passage inside the inner tube for prompting the transfer of the polyvinyl chloride resin and heating medium.

Processing conditions and results of these examples are shown in Table 9. Table 9 demonstrates that the method in accordance with the present invention is capable of removing chlorine from the polyvinyl chloride resin with great efficiency and recovering a high concentration of gaseous hydrogen chloride, although the exhausted gas contains a trace amount of gaseous lower hydrocarbon.

TABLE 9

| No. | Example 1 | Example 2 |
|---|---|---|
| Heating Temp. (°C.) | 320 | 320 |
| Heating gas feeding rate (Nm$^3$/h) | 3000 | 3000 |
| Carrier gas feeding rate (Nm$^3$/h) | 25 | 25 |
| PVC feeding rate (kg/h) | 50 | 70 |
| Heating medeum feeding rate (kg/h) | 20 | 10 |
| Recovered residue (kg/h) | 51.9 | 55.2 |
| Cl content in residue (%) | 0.67 | 1.77 |
| Exhausted gas flow in inner tube (Nm$^3$/h) | 36.2 | 40.4 |
| HCl content in exhausted gas (%) | 29.8 | 36.9 |
| Dechlorination rate (%) | 98 | 96 |

Figure 27:
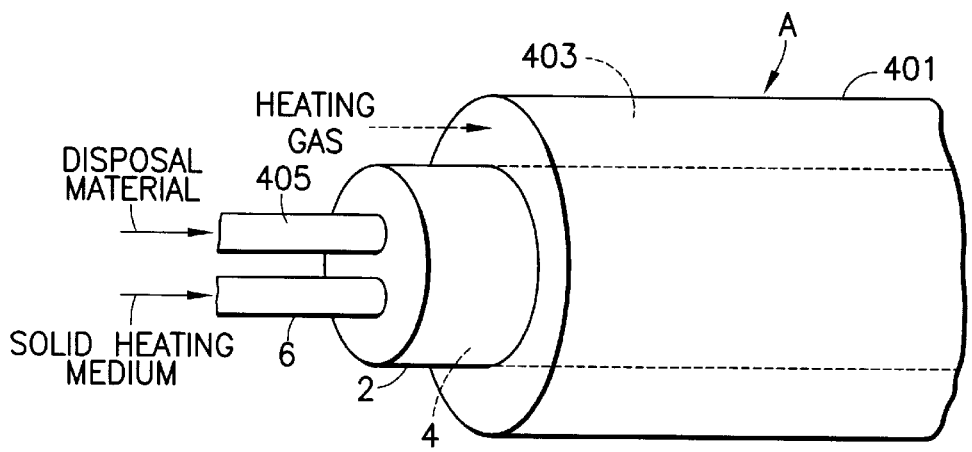
FIG. 27 is a explanation view illustrating an embodiment of an apparatus in accordance with the present invention.
Figure 28:
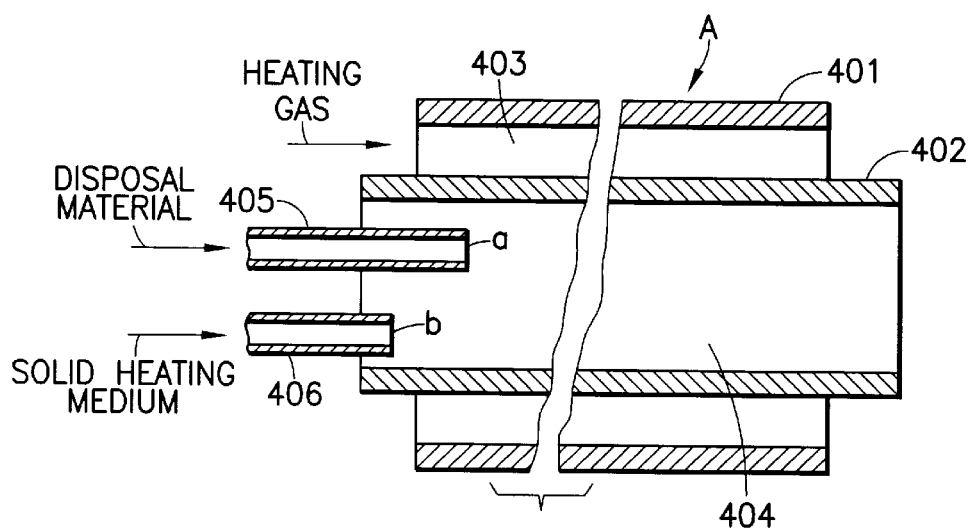
FIG. 28 is a longitudinal cross-sectional view of the apparatus shown in FIG. 27.
Figure 29:
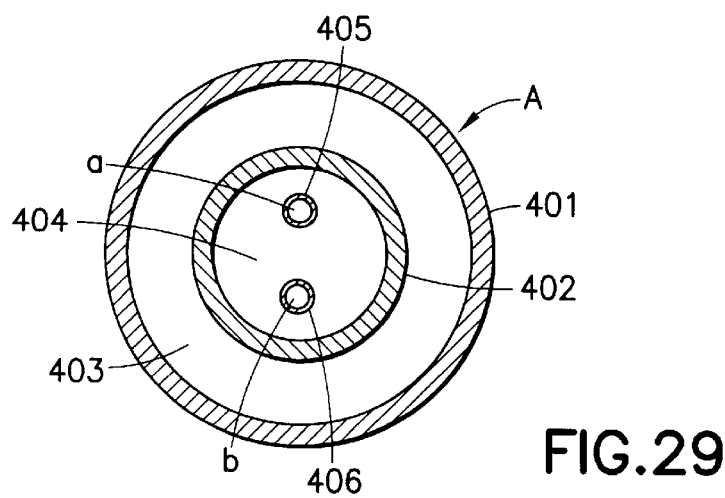
FIG. 29 is a transverse cross-sectional view of the apparatus shown in FIG. 27.

FIGS. 27 to 29 show an embodiment of a method and an apparatus, using a rotary kiln by means of an external gas heating system, in accordance with the present invention. In the drawings, character A represents a main body of the rotary kiln, numeral 401 represents an outer tube of the main body and numeral 402 represents an inner tube which is concentrically arranged inside the outer tube 401 along the longitudinal direction. The inside of the inner tube 402 is used as a passage 404 (a space for disposal) for the material to be disposed (hereinafter disposing material) and a space between the outer tube 401 and the inner tube 402 is used as a passage 403 for a heating gas.

One end of the inner tube 402 forming the passage 404 extends to the exterior of the outer tube 401 and is provided as a material feeding section.

In such a rotary kiln, the disposal material (chlorine-containing organic resinous material when the disposal material substantially consists of only chlorine containing material) and a solid heating medium are fed into a passage 404 through a quantitative supply unit (not shown in the drawings), while a heating gas is fed into the passage 403 through a hot air conduit. The heating gas supplied to the passage 403 heats the entire inner tube 402 and the disposal material through the tube wall. The heating gas passing through the passage 403 is exhausted from the outlet (not shown in the drawings) of the rotary kiln.

On the other hand, the disposal material and solid heating medium fed in the passage inside the inner tube 402 are transferred and heated in the passage 404 while being mixed by means of the rotation of the inner tube 402. Chlorine in the chlorine containing polymeric resins contained in the disposal material is eliminated as hydrogen chloride due to heat, resulting in hydrogen chloride gas evolution. The exhausted gas containing hydrogen chloride gas and the resinous residue after dechlorination are discharged to an exhaust apparatus. The exhausted gas, the resinous residue and the hydrogen chloride gas are separated and independently recovered. Therefore, the hydrogen chloride gas formed by the heating of the chlorine containing resins can be recovered without mixing with the heating gas.

In the present invention, the disposal material is fed to a more inner side of the kiln relative to the side in which the solid heating medium is fed, when the disposal material and the solid heating medium are fed in the rotary kiln during dechlorination of the chlorine containing resins in the rotary kiln.

In FIGS. 27 to 29, numerals 405 and 406 represent material supply means provided at the material supply sections at the inlet side of the rotary kiln. The material supply ports a and b of these material supply means 405 and 406 are located at different places of the rotary kiln along the longitudinal direction. In this embodiment, these material supply means 405 and 406 are composed of supply tubes, and chips of these supply tubes form the material supply ports a and b. Since, the solid heating medium is fed from the material supply means 406 and the disposal material is fed from the material supply means 405 in the material supply section having such a configuration, the disposal material can be fed to the more inner side of the rotary kiln relative to the side in which the solid heating medium is fed.

By supplying the disposal material and the solid heating medium as described above, the solid heating material is supplied into the kiln prior to the disposal material, and the disposal material is fed onto the solid heating medium which is previously heated by contacting with the hot inner tube of the kiln. Therefore, the disposal material is effectively heated by the solid heating medium in the initial stage of dechlorination, and thus a high dechlorination efficiency is achieved. Since the solid heating medium is present between the disposal material and the kiln inner tube at the initial stage of thermal decomposition of the melted resin, adhesion of the resinous residue to the kiln inner tube can be effectively reduced.

As shown in FIG. 28, in the material supply ports a and b of a plurality of the material supply means 405 and 406, the material supply port at the more inner side of the rotary kiln is preferably disposed on the upper side of the kiln. Thus, the material supply means 405 and 406 are formed of tubular members as shown in the drawings and their ends can be used as the material supply ports a and b.

In the method in accordance with the present invention, pulverized and/or crushed materials having a higher specific gravity than those of the chlorine containing resin and the heating material may be supplied as an additive with the disposal material (chlorine-containing organic resinous material when the disposal material substantially consists of only chlorine containing material) and the solid heating medium. The additive having a higher specific gravity is dislocated at the kiln inner side relative to the chlorine containing resin and the solid heating medium, and displaced between the disposal material and kiln inner side. Therefore, adhesion of the resinous residue to the kiln inner side can be more effectively suppressed, resulting in a higher dechlorination efficiency.

The disposal material is supplied to the more inner side of the rotary kiln relative to the position for supplying the solid heating medium and the additive even when the additive is supplied. In this case, the disposal material, solid heating medium and the additive may be supplied from their own material supply means, for example, the additive is supplied to the inlet side of the material supply section, the solid heating medium is supplied into the inner side of the kiln, and the disposal material is supplied into the more inner side of the kiln. Alternatively, in a more simplified system, the solid heating medium and the additive are supplied from the material supply means 6 and the disposal material may be supplied from the material supply means 405 using the apparatus described in FIGS. 27 to 29.

Examples of preferable solid heating medium used in the present invention include raw materials for furnaces, e.g. iron sources for furnaces, reducing agents of iron sources, fuels and powdery materials usable as auxiliary materials. These materials can prevent noticeable dislocation and can be supplied to furnaces (particularly melting furnaces), such as blast furnaces, together with the resinous residue after dechlorination without separation. Therefore, the resinous residue after dechlorination can be supplied to the melting furnaces as a reducing agent for iron sources and a fuel without separation from the solid heating medium.

Powdery materials suitable for such heating media include, for example, coke, iron ore, sintered ores and thermosetting resins (e.g. phenol resins and urea resins). One or more kinds of these material may be used as a solid heating medium. It is preferable that the specific gravity of the heating medium be as near as possible to that of the resinous material in order to prevent dislocation of the solid heating medium and to improve the heating effect of the disposal material in the kiln. Therefore, it is most preferable that powdery coke or thermosetting resins be used as a solid heating medium.

Examples of preferable additives used in the present invention include pulverized or crushed iron ore, sintered ores and scrap iron. These additives can be supplied to the furnaces (particularly melting furnaces), such as blast furnaces, without separating from the resinous residue after dechlorination. One or more kinds of additives are preferably used.

The amount of the additive can be appropriately determined in response to the amounts of the disposal material and the solid heating medium. It is preferable that the additive be present such that the mixture of the disposal material and the solid heating medium come into contact with the kiln inner wall and the additive be dislocated between the mixture of the disposal material and the solid heating medium and the kiln inner wall during dechlorination. Thus, the supplied amount is preferably determined so as to have such a distribution in the kiln.

When supplying an additive in the present invention, by using a powdery material as a solid heating medium which is usable as an iron source in a furnace, a reducing agent for an iron source, a fuel, or an auxiliary material (e.g. a powdery material consisting of at least one kind selected from coke, iron ore, sintered ore or a thermoplastic resin) and by using a powdery material as an additive consisting of at least one kind selected from iron ore, sintered ore and scrap iron, the resinous residue after dechlorination can be supplied to the melting furnace or the like as a reducing agent for an iron source or a fuel without separation from the heating medium and the additive.

In the above description, the same kinds of powdery materials, for example, iron ore and sintered ore, are exemplified as preferable solid heating media and additives. Since the present invention is characterized in that the specific gravity of the additive is higher than that of the solid heating medium, any combination of the solid heating media and the additives satisfying such a condition can be selected.

It is preferable that the heating temperature of the disposal material in the kiln (inside the passage 4 in this embodiment) be in a range of 250 to 350° C., and more preferably near 300° C. A heating temperature lower than 250° C. does not result in effective elimination of hydrogen chloride, whereas a temperature over 350° C. causes thermal decomposition of the resinous material into gas and liquid hydro carbons.

In the present invention, a small amount of carrier gas such as air may be introduced into the passage 404.

What is claimed is:

1. A method for disposing of synthetic resinous material, the method comprising:

processing a chlorine containing synthetic resinous material into shapes suitable for supply into a furnace;

said processing of the synthetic resinous material including dechlorinating the chlorine containing synthetic resinous material by heating the synthetic resinous material and thermally decomposing the same; and supplying the dechlorinated synthetic resinous material into the furnace as a fuel or a reducing agent.

2. The method of claim 1, wherein said processing of the synthetic resinous material comprises:

said dechlorinating of the synthetic resinous material by heating the chlorine containing synthetic resinous material and decomposing the same, to form the dechlorinated synthetic resinous material followed by pulverizing the dechlorinated synthetic resinous material.

3. The method of claim 1, wherein the synthetic resinous material comprises both chlorine containing and non-chlorine containing resins and said processing of the synthetic resinous material comprises: separating a chlorine containing polymeric resins from the synthetic resinous material to obtain a first synthetic resinous material not substantially containing the chlorine containing polymeric resins; and dechlorinating the separated chlorine containing polymeric resins by heating the separated chlorine containing polymeric resins and decomposing the same to obtain a second synthetic resinous material not substantially containing chlorine, said supplying of the synthetic resinous material comprises supplying the first synthetic resinous material and the second synthetic resinous material to the furnace.

4. The method of claim 1, wherein said processing of the synthetic resinous material comprises:

supplying the synthetic resinous material and a particulate material into a rotary kiln; and dechlorinating the supplied synthetic resinous material by heating the supplied synthetic resinous material and the particulate material.

5. The method of claim 4, wherein the heating of the synthetic resinous material is carried out by a heating means arranged at the outside of the rotary kiln.

6. The method of claim 4, wherein the heating of the synthetic resinous material comprises supplying a heating gas into the rotary kiln to heat the synthetic resinous material and heating medium.

7. The method of claim 4, wherein the rotary kiln comprises an outer tube and an inner tube which is arranged in the outer tube, the synthetic resinous material and the particulate material being supplied into the inside of the inner tube, and a heating gas being supplied to a space between the inner tube and the outer tube.

8. The method of claim 4, wherein said supplying of the synthetic resinous material and the particulate material comprises supplying the synthetic resinous material and the particulate material into an inner tube of the rotary kiln, the rotary kiln having an outer tube and the inner tube which is arranged in the outer tube; and said heating of the synthetic resinous material and the particulate material comprises supplying a heating gas into a space between the inner tube and the outer tube.

9. The method of claim 4, wherein said supplying of the synthetic resinous material and the particulate material is carried out so that a supplying position of the synthetic resinous material is farther from an inlet of the rotary kiln than a supplying position of the particulate material.

10. The method of claim 4, wherein said supplying of the synthetic resinous material and the particulate material comprises supplying the synthetic resinous material, the particulate material and a fine additive having a specific gravity more than those of the synthetic resinous material and the particulate material so that a supplying position of the synthetic resinous material is farther from an inlet of the rotary kiln than supplying positions of the particulate material and the fine additive.

11. The method of claim 10, wherein the fine additive is at least one selected from the group consisting of iron ore, sintered ore and iron scrap.

12. The method of claim 4, wherein the particulate material is an iron source, a reducing agent, a fuel or an auxiliary material.

13. The method of claim 10, wherein the particulate material is at least one selected from the group consisting of a fine coke, a fine iron ore, a fine sintered ore, a fine thermosetting resin and fine iron scrap.

14. The method of claim 1, wherein said processing of the synthetic resinous material comprises:

providing a rotary kiln having an outer tube and an inner tube which is arrnged in the outer tube;

supplying the synthetic resinous material and a heating medium into the inner tube;

supplying a heating gas into a space between the inner tube and the outer tube;

heating the synthetic resinous material and the heating medium to melt the synthetic resinous material; and blowing a hot air having a temperature higher than a melting temperature of the synthetic resinous material at an melting portion of the synthetic resinous material inside of the inner tube.

15. The method of claim 14, wherein the hot air is blown to the inside wall of the inner tube.

16. The method of claim 1, wherein said processing of the synthetic resinous material comprises:

heating the chlorine containing synthetic resinous material and a thermosetting resin in a rotary kiln to melt the thermosetting resin and form a molten plastic; and heating the molten plastic sufficiently to thermally decompose the chlorine containing synthetic resinous material to hydrogen chloride and a residue of the chlorine containing synthetic resinous material.

17. The method of claim 1, wherein said synthetic resinous material is in the form of a synthetic resin film; and said processing of the synthetic resinous material comprising:

crushing the synthetic resin film;

reducing a volume of the crushed synthetic resin film; and heating the volume reduced synthetic resin film to decompose the same.

18. The method of claim 1, wherein said synthetic resinous material includes steel having a coating film comprising a chlorine containing resin; and said processing of the synthetic resinous material comprises heating the synthetic resinous material to thermally decompose the chlorine containing resin.

19. The method of claim 1, wherein said synthetic resinous material includes metal having a coating film comprising a chlorine containing resin; and said processing of the synthetic resinous material comprises heating the synthetic resinous material to decompose the chlorine containing resin.

20. The method of claim 17 wherein the synthetic resinous material has a thickness of up to 100 $\mu$m.

* * * * *